US011550796B2

(12) United States Patent
Gaur et al.

(10) Patent No.: US 11,550,796 B2
(45) Date of Patent: Jan. 10, 2023

(54) COEXISTENCE MEDIATOR FOR FACILITATING BLOCKCHAIN TRANSACTIONS

(71) Applicant: International Business Machines Corporation, Armonk, NY (US)

(72) Inventors: Nitin Gaur, Round Rock, TX (US); Petr Novotny, Mount Kisco, NY (US); Qi Zhang, Elmsford, NY (US); Wisam Mohammed, San Jose, CA (US)

(73) Assignee: International Business machines Corporation, Armonk, NY (US)

( * ) Notice: Subject to any disclaimer, the term of this patent is extended or adjusted under 35 U.S.C. 154(b) by 0 days.

(21) Appl. No.: 17/111,562

(22) Filed: Dec. 4, 2020

(65) Prior Publication Data

US 2022/0179869 A1 Jun. 9, 2022

(51) Int. Cl.
*G06F 16/24* (2019.01)
*G06F 16/2457* (2019.01)
(Continued)

(52) U.S. Cl.
CPC ........ *G06F 16/24575* (2019.01); *G06F 9/466* (2013.01); *G06F 16/211* (2019.01);
(Continued)

(58) Field of Classification Search
CPC .. G06F 16/24575; G06F 9/466; G06F 16/211; G06F 16/2343; H04L 9/0643; H04L 2209/38
See application file for complete search history.

(56) References Cited

U.S. PATENT DOCUMENTS 10,108,954 B2 10/2018 Dunlevy et al.
10,447,478 B2 10/2019 Gray
(Continued)

OTHER PUBLICATIONS

Gray, M., "Introducing Project Bletchley and elements of blockchain born in the Microsoft Cloud", 5 pages, Jun. 15, 2016.
(Continued)

*Primary Examiner* — Cindy Nguyen
(74) *Attorney, Agent, or Firm* — Mark Bergner

(57) ABSTRACT

A system and related method coordinate data and transactions between an enterprise transaction system (ETS) of an enterprise and a blockchain network (BN). A coexistence mediator intercepts an ETS transaction comprising ETS transaction information (ETS-TI) associated with an enterprise. The ETS-TI includes transaction context information (ETS-TCI) regarding the ETS transaction. The system determines an ETS transaction context from the ETS-TCI. Responsive to determining the ETS transaction context represents an in-flight ETS transaction, rerouting, the coexistence mediator reroutes the transaction from the ETS to the BN. The rerouting comprises converting the ETS-TI to BN transaction information (BN-TI), and interfacing with the BN to record a processed BN transaction as a transaction record. The coexistence mediator, upon recording the BN transaction, provides a new BN-TI associated with the BN transaction. The new BN-TI comprises a BN transaction id. The system further switches the ETS transaction context to a BN transaction context.

20 Claims, 24 Drawing Sheets

(51) Int. Cl.
  *G06F 16/21* (2019.01)
  *G06F 9/46* (2006.01)
  *H04L 9/06* (2006.01)
  *G06F 16/23* (2019.01)
  *H04L 9/00* (2022.01)

(52) U.S. Cl.
  CPC ........ *G06F 16/2343* (2019.01); *H04L 9/0643* (2013.01); *H04L 9/50* (2022.05)

(56) References Cited

U.S. PATENT DOCUMENTS

2015/0379510 A1    12/2015  Smith
2016/0292672 A1*   10/2016  Fay .................... G06Q 20/3827
2017/0243193 A1     8/2017  Manian et al.
2019/0073666 A1*    3/2019  Ortiz ................. G06Q 20/3674

OTHER PUBLICATIONS

"Keychain Accelerates Enterprise Blockchain Adoption with Bitcoin Data Security and Identity Layer", 3 pages, Sep. 5, 2019.
Pérez, Juan Miguel, "The challenges facing enterprise adoption of blockchain and why middleware is the solution", Finboot, 6 pages, May 22, 2020, found at: www.finboot.com/post/the-challenges-facing-enterprise-adoption-of-blockchain-and-why-middleware-is-the-solution.
Kothiyal, S., "Combinatorial Opportunity with Blockchain and ERP!!", 8 pages, May 22, 2020, found at: www.linkedin.com/pulse/combinatorial-opportunity-blockchain-erp-sumit-kothiyal.
"Enterprise middleware for blockchain smart contracts", Second State, May 22, 2020, 9 pages, found at: docs.secondstate.io/white-papers/enterprise-middleware-for-blockchain-smart-contracts.
Ibryam, Bilgin, "The next integration evolution—blockchain", TechCrunch, 17 pages, Feb. 5, 2019.
Abebe, E. et al., "Enabling Enterprise Blockchain Interoperability with Trusted Data Transfer (industry track)", 7 pages, Middleware '19, Dec. 9-13, 2019, Davis, CA, USA.
Rojas, L.D., Why Integrating ERP Systems into Blockchain Is a Great Idea?, EOS Costa Rica, Oct. 30, 2019, 4 pages.
Gaur, N., "Blockchain Technology Series: Enterprise Guideline for Blockchain Adoption—Understanding the technology landscape and Design Choice Framework (DCF)", 13 pages, Mar. 9, 2019, found at: www.linkedin.com/pulse/blockchain-technology-series-enterprise-guideline-adoption-nitin-gaur/.
Behlendorf, Brian, "Blockchain is Here for the Enterprise: The Hyperledger Project", Hitachi Consulting, 2 pages, found at: www.hitachivantara.com/content/dam/hcc/en/documents/industries/financial-services/blockchain-is-here-for-the-enterprise.pdf.
Mell, P. et al., "The NIST Definition of Cloud Computing", Recommendations of the National Institute of Standards and Technology, NIST Special Publication 800-145, 7 pages, Sep. 2011.

\* cited by examiner

US 11,550,796 B2

COEXISTENCE MEDIATOR FOR FACILITATING BLOCKCHAIN TRANSACTIONS

BACKGROUND

Disclosed herein is a system and related method for utilizing a coexistence mediator for facilitating blockchain transactions. More specifically, the coexistence mediator facilitates transitioning from an enterprise transaction-based system to a blockchain transaction-based system.

SUMMARY

According to one aspect disclosed herein, a computer-implemented method is provided for coordinating data and transactions between an enterprise transaction system (ETS) of an enterprise and a blockchain network (BN). The method comprises intercepting, by a coexistence mediator, an ETS transaction comprising ETS transaction information (ETS-TI) associated with an enterprise. The ETS-TI includes transaction context information (ETS-TCI) regarding the ETS transaction. The method determines an ETS transaction context from the ETS-TCI, and responsive to determining the ETS transaction context represents an in-flight ETS transaction, rerouting, by the coexistence mediator, the transaction from the ETS to the BN. The rerouting comprises converting the ETS-TI to BN transaction information (BN-TI), and interfacing with the BN to create and record a processed BN transaction as a transaction record. The coexistence mediator, upon recording the BN transaction, provides a new BN-TI associated with the BN transaction. The new BN-TI comprises a BN transaction id. The method further switches the ETS transaction context to a BN transaction context.

According to another aspect disclosed herein, a system is provided for coordinating data and transactions between an enterprise transaction system (ETS) of an enterprise and a blockchain network (BN). A coexistence mediator intercepts an ETS transaction comprising ETS transaction information (ETS-TI) associated with an enterprise. The ETS-TI includes transaction context information (ETS-TCI) regarding the ETS transaction. The system determines an ETS transaction context from the ETS-TCI. Responsive to determining the ETS transaction context represents an in-flight ETS transaction, rerouting, the coexistence mediator reroutes the transaction from the ETS to the BN. The rerouting comprises converting the ETS-TI to BN transaction information (BN-TI), and interfacing with the BN to create and record a processed BN transaction as a transaction record. The coexistence mediator, upon recording the BN transaction, provides a new BN-TI associated with the BN transaction. The new BN-TI comprises a BN transaction id. The system further switches the ETS transaction context to a BN transaction context.

According to another aspect disclosed herein, a computer program product comprises instructions for one or more processors to implement the various functions describe above. The computer program product contains instructions that are, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1A:
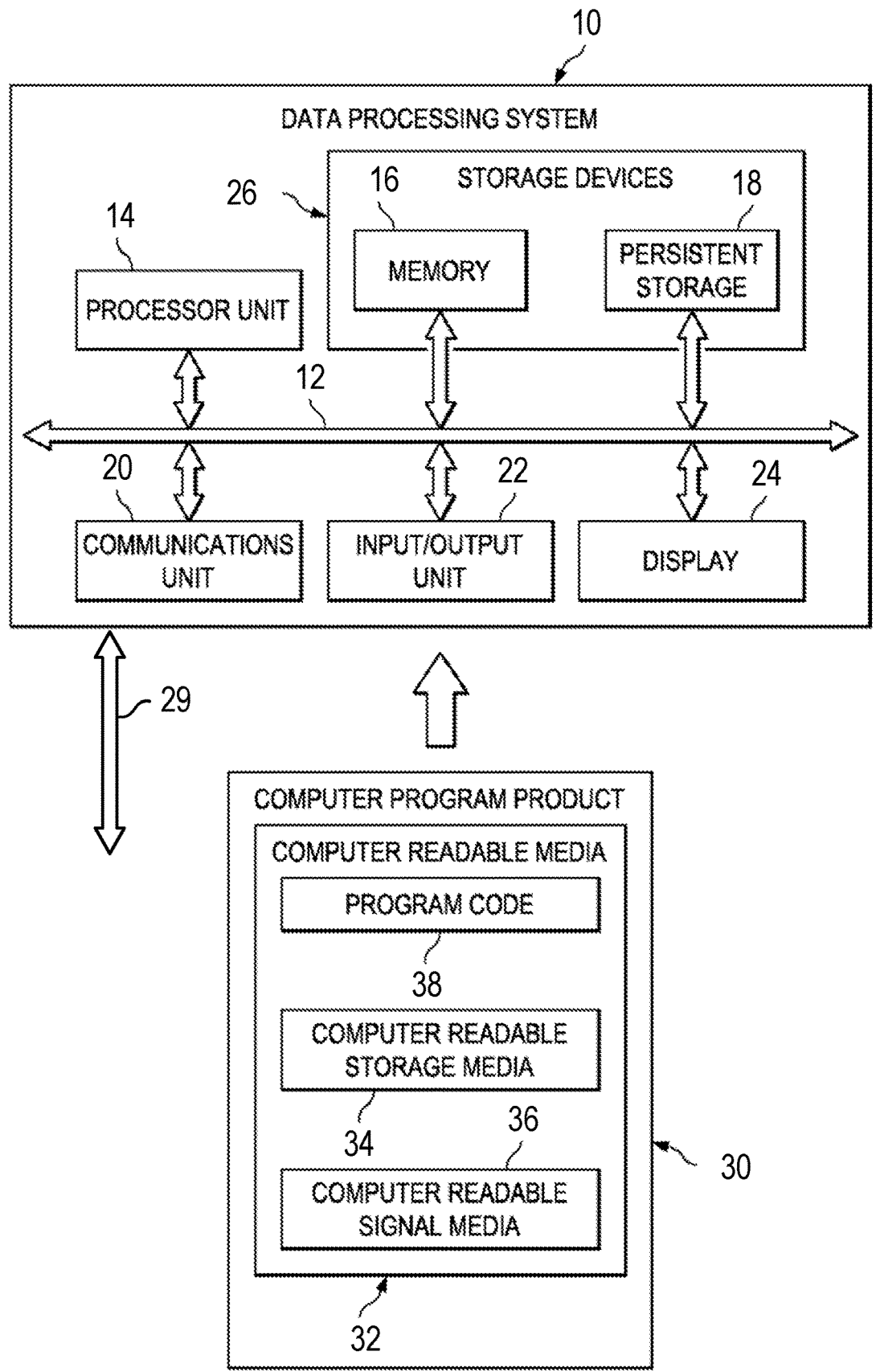
FIG. 1A is a block diagram of a data processing system (DPS) according to one or more embodiments disclosed herein.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network Data Processing System in General FIG. 1A is a block diagram of an example DPS according to one or more embodiments. In this illustrative example, the DPS 10 may include communications bus 12, which may provide communications between a processor unit 14, a memory 16, persistent storage 18, a communications unit 20, an I/O unit 22, and a display 24.

The processor unit 14 serves to execute instructions for software that may be loaded into the memory 16. The processor unit 14 may be a number of processors, a multi-core processor, or some other type of processor, depending on the particular implementation. A number, as used herein with reference to an item, means one or more items. Further, the processor unit 14 may be implemented using a number of heterogeneous processor systems in which a main processor is present with secondary processors on a single chip. As another illustrative example, the processor unit 14 may be a symmetric multi-processor system containing multiple processors of the same type.

The memory 16 and persistent storage 18 are examples of storage devices 26. A storage device may be any piece of hardware that is capable of storing information, such as, for example without limitation, data, program code in functional form, and/or other suitable information either on a temporary basis and/or a permanent basis. The memory 16, in these examples, may be, for example, a random access memory or any other suitable volatile or non-volatile storage device. The persistent storage 18 may take various forms depending on the particular implementation.

For example, the persistent storage 18 may contain one or more components or devices. For example, the persistent storage 18 may be a hard drive, a flash memory, a rewritable optical disk, a rewritable magnetic tape, or some combination of the above. The media used by the persistent storage 18 also may be removable. For example, a removable hard drive or universal serial bus (USB) drive may be used for the persistent storage 18.

The communications unit 20 in these examples may provide for communications with other DPSs or devices. In these examples, the communications unit 20 is a network interface controller. The communications unit 20 may provide communications through the use of either or both physical and wireless communications links.

The input/output unit 22 may allow for input and output of data with other devices that may be connected to the DPS 10. For example, the input/output unit 22 may provide a connection for user input through a keyboard, a mouse, and/or some other suitable input device. Further, the input/output unit 22 may send output to a printer. The display 24 may provide a mechanism to display information to a user.

Instructions for the operating system, applications and/or programs may be located in the storage devices 26, which are in communication with the processor unit 14 through the communications bus 12. In these illustrative examples, the instructions are in a functional form on the persistent storage 18. These instructions may be loaded into the memory 16 for execution by the processor unit 14. The processes of the different embodiments may be performed by the processor unit 14 using computer implemented instructions, which may be located in a memory, such as the memory 16. These instructions are referred to as program code 38 (described below) computer usable program code, or computer readable program code that may be read and executed by a processor in the processor unit 14. The program code in the different embodiments may be embodied on different physical or tangible computer readable media, such as the memory 16 or the persistent storage 18.

The DPS 10 may further comprise an interface for a network 29. The interface may include hardware, drivers, software, and the like to allow communications over wired and wireless networks 29 and may implement any number of communication protocols, including those, for example, at various levels of the Open Systems Interconnection (OSI) seven layer model.

FIG. 1A further illustrates a computer program product 30 that may contain the program code 38. The program code 38 may be located in a functional form on the computer readable media 32 that is selectively removable and may be loaded onto or transferred to the DPS 10 for execution by the processor unit 14. The program code 38 and computer readable media 32 may form a computer program product 30 in these examples. In one example, the computer readable media 32 may be computer readable storage media 34 or computer readable signal media 36. Computer readable storage media 34 may include, for example, non-transitory media such as an optical or magnetic disk that is inserted or placed into a drive or other device that is part of the persistent storage 18 for transfer onto a storage device, such as a hard drive, that is part of the persistent storage 18. The computer readable storage media 34 also may take the form of a persistent storage, such as a hard drive, a thumb drive, or a flash memory, that is connected to the DPS 10. In some instances, the computer readable storage media 34 may not be removable from the DPS 10.

Alternatively, the program code 38 may be transferred to the DPS 10 using the computer readable signal media 36. The computer readable signal media 36 may be, for example, a propagated data signal containing the program code 38. For example, the computer readable signal media 36 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 38 may be downloaded over a network to the persistent storage 18 from another device or DPS through the computer readable signal media 36 for use within the DPS 10. For instance, program code stored in a computer readable storage medium in a server DPS may be downloaded over a network from the server to the DPS 10. The DPS providing the program code 38 may be a server computer, a client computer, or some other device capable of storing and transmitting the program code 38.

The different components illustrated for the DPS 10 are not meant to provide architectural limitations to the manner in which different embodiments may be implemented. The different illustrative embodiments may be implemented in a DPS including components in addition to or in place of those illustrated for the DPS 10.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1B:
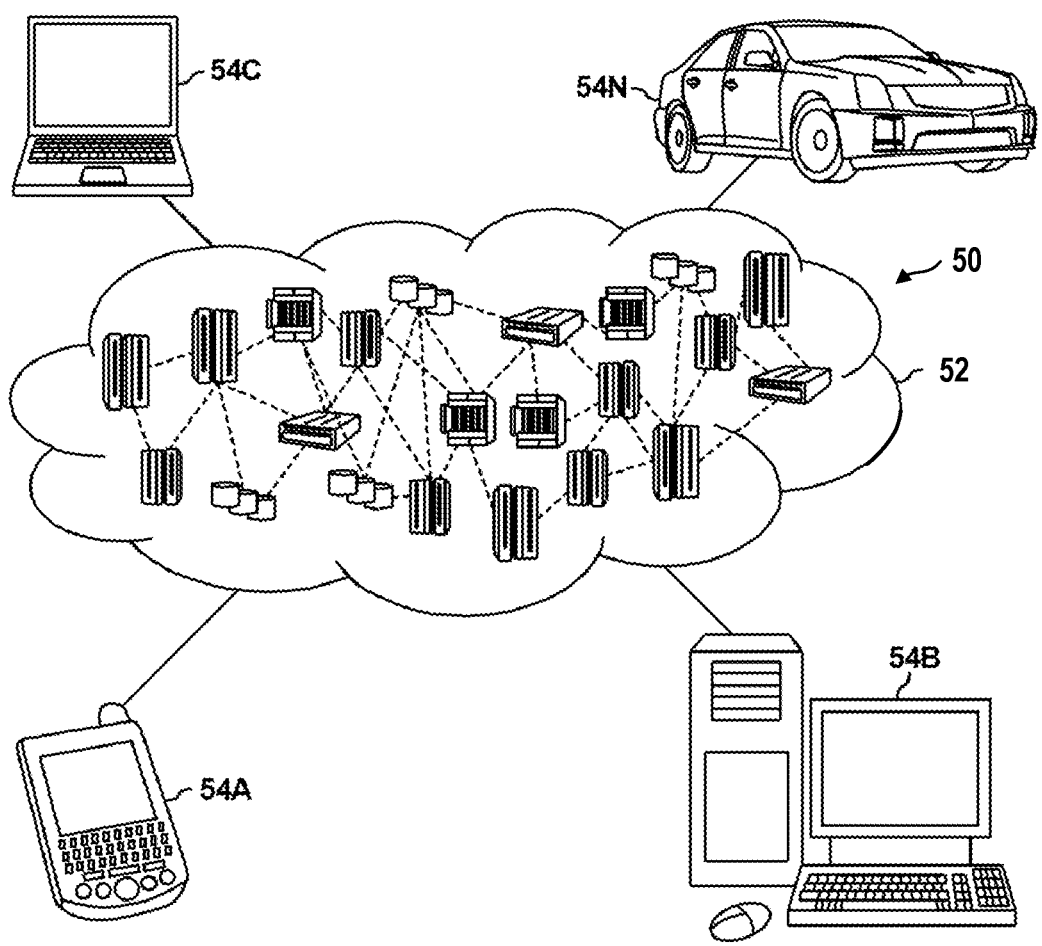
FIG. 1B is a pictorial diagram that depicts a cloud computing environment according to an embodiment disclosed herein.

Referring now to FIG. 1B, illustrative cloud computing environment 52 is depicted. As shown, cloud computing environment 52 includes one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 1B are intended to be illustrative only and that computing nodes 50 and cloud computing environment 52 can communicate with any type of computerized device over any type of network and/or network addressable connection (e.g., using a web browser).

Figure 1C:
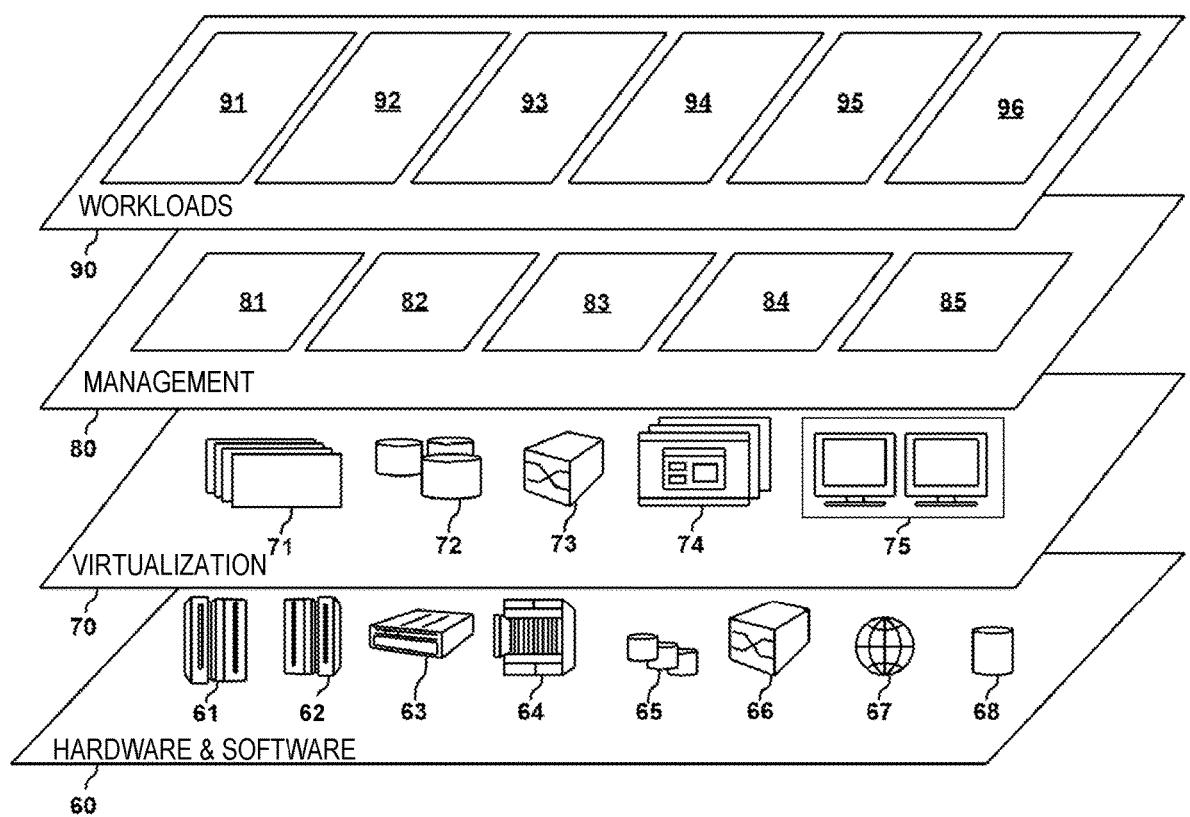
FIG. 1C is a pictorial diagram that depicts abstraction model layers according to an embodiment disclosed herein.

Referring now to FIG. 1C, a set of functional abstraction layers provided by cloud computing environment 52 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Any of the nodes 50 in the computing environment 52 as well as the computing devices 54A-N may be a DPS 10.

Blockchain Basic Detail

The instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in example embodiments, the application is not limited to a certain type of connection, message, and signaling.

Example embodiments provide methods, systems, components, non-transitory computer readable media, devices, and/or networks, which provide for a privacy-preserving attribute-based document sharing in blockchain networks.

In one embodiment the application utilizes a decentralized database (such as a blockchain) that is a distributed storage system, which includes multiple nodes that communicate with each other. The decentralized database may include an append-only immutable data structure resembling a distributed ledger capable of maintaining records between parties without a trust relationship (e.g., mutually untrusted parties) and without the need for a trusted intermediary. The untrusted parties are referred to herein as peers or peer nodes. Each peer typically maintains a copy of the distributed ledger and no single peer can modify the distributed ledger without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains can involve native cryptocurrency and use consensus based on various protocols, such as Proof of Work (PoW). On the other hand, a permissioned blockchain database may provide secure interactions among a group of entities which share a common goal but which do not fully trust one another, such as businesses that exchange funds, goods, information, and the like.

Some embodiments may include an application that can utilize a blockchain that operates arbitrary, programmable logic, tailored to a decentralized storage scheme and referred to as "smart contracts" or "chaincodes." In some cases, specialized chaincodes may exist for management functions and parameters, which are referred to as system chaincode. The application may further utilize smart contracts, which are trusted distributed applications that leverage tamper-proof properties of the blockchain database and an underlying agreement between nodes (which is referred to as an endorsement or endorsement policy). Blockchain transactions associated with this application can be "endorsed" before being committed to the blockchain while transactions, which are not endorsed, are disregarded. An endorsement policy may allow chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol may be used to produce an ordered sequence of endorsed transactions grouped into blocks.

In some embodiments, the application can utilize nodes that are the communication entities of the blockchain network. A "node" may perform a logical function in the sense that multiple nodes of different types can run on the same physical server. Nodes may be grouped in trust domains and may be associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node, which can receive client submitted transactions, commit the transactions, and maintain a state and a copy of the ledger of blockchain transactions. Peers can also have the role of an endorser, although it is not a requirement. An ordering-service-node or orderer may be a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This application can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain), which is used to store an immutable, sequenced record in blocks. The ledger also includes a state database, which maintains a current state of the blockchain.

This application can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be an indexed view into the chain's transaction log, and can therefore be regenerated from the chain at any time. The state database can automatically be recovered (or generated if needed) upon peer node startup, and before transactions are accepted.

Some benefits of the instant solutions described and depicted herein include a method and system for a privacy-preserving, attribute-based document sharing in blockchain networks in blockchain networks. The example embodiments solve the issues of time and trust by extending features of a database such as immutability, digital signatures, and being a single source of truth. The example embodiments provide a solution for a privacy-preserving attribute-based document sharing in blockchain networks in blockchain-based network. The blockchain networks may be homogenous based on the asset type and rules that govern the assets based on the smart contracts.

Blockchain is different from a traditional database in that blockchain is not a central storage, but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, etc., which are further described herein. According to various aspects, the system for a privacy-preserving attribute-based document sharing in blockchain networks in blockchain networks is implemented due to immutable accountability, security, privacy, permitted decentralization, availability of smart contracts, endorsements and accessibility that are inherent and unique to blockchain. In particular, the blockchain ledger data is immutable and that provides for efficient method for a privacy-preserving attribute-based document sharing in blockchain networks in blockchain networks. Also, use of the encryption in the blockchain provides security and builds trust. The smart contract manages the state of the asset to complete the life-cycle. The example blockchains are permission decentralized. Thus, each end user may have its own ledger copy to access. Multiple organizations (and peers) may be on-boarded on the blockchain network. The key organizations may serve as endorsing peers to validate the smart contract execution results, read-set and write-set. In other words, the blockchain inherent features provide for efficient implementation of a method for a privacy-preserving attribute-based document sharing in blockchain networks.

One of the benefits of the example embodiments is that it improves the functionality of a computing system by implementing a method for a privacy-preserving attribute-based document sharing in blockchain-based systems. Through the blockchain network described herein, a computing system can perform functionality for a privacy-preserving attribute-based document sharing in blockchain networks in blockchain networks by providing access to capabilities such as distributed ledger, peers, encryption technologies, managed service provider (MSP), event handling, etc. Also, the blockchain enables the creation of a business network and make any users or organizations to on-board for participation. As such, the blockchain is not just a database. The blockchain comes with capabilities to create a business network of users and on-board/off-board organizations to collaborate and execute service processes in the form of smart contracts.

The example embodiments provide numerous benefits over a traditional database. For example, through the blockchain, the embodiments provide for immutable accountability, security, privacy, permitted decentralization, availability of smart contracts, endorsements, and accessibility that are unique to the blockchain.

Meanwhile, a traditional database could not be used to implement the example embodiments because it does not bring all parties on the business network, it does not create trusted collaboration, and does not provide for an efficient storage of digital assets. The traditional database does not provide for a tamper proof storage and does not provide for preservation of the digital assets being stored. Thus, the proposed method for a privacy-preserving attribute-based document sharing in blockchain networks cannot be implemented in the traditional database.

Meanwhile, if a traditional database were to be used to implement the example embodiments, the example embodiments would have suffered from unnecessary drawbacks such as search capability, lack of security, and slow speed of transactions. Additionally, the automated method for a privacy-preserving attribute-based document sharing in a blockchain network would simply not be possible.

Accordingly, the example embodiments provide for a specific solution to a problem in the arts/field of an attribute-based document sharing.

The example embodiments also change how data may be stored within a block structure of the blockchain. For example, a digital asset data may be securely stored within a certain portion of the data block (i.e., within header, data segment, or metadata). By storing the digital asset data within data blocks of a blockchain, the digital asset data may be appended to an immutable blockchain ledger through a hash-linked chain of blocks. In some embodiments, the data block may be different than a traditional data block by having a personal data associated with the digital asset not stored together with the assets within a traditional block structure of a blockchain. By removing the personal data associated with the digital asset, the blockchain can provide the benefit of anonymity based on immutable accountability and security.

According to the example embodiments, a system and method for a privacy-preserving attribute-based document sharing in blockchain networks are provided. A blockchain document processor may have two components:
  a private off-chain processor that manages secure processing of private information related to a participant; and
  a ledger processor that manages processing of common information shared with all participants of a blockchain network using the consensus algorithm of the network.

According to the example embodiments, each of the organizations that intend to share documents with other organizations uses a blockchain document processor connected to a blockchain network. Using the document processor, the organizations may set up the following on the ledger:
  a list of document templates;
  attributes of each document template that will be shared in hashed form on the ledger;
  a combination of key attributes from different templates for matching and sharing documents; and
  partnership Merkel trees: each partnership Merkel tree may be built based on partnering organizations' identifiers (IDs).

All documents (files, JSONs) are stored on the off-chain data store. Only the attribute hashes and the document identifier (ID) are submitted as a part of a blockchain transaction.

According to one example embodiment, a document identifier and a document type may be linked to hashed attributes for sharing. Hashed owner's organization id may include composite keys such that:
  given the document ID, a document processor may get all hashed attributes for sharing; and
  given a hashed attribute for sharing, the document processor may get all document IDs and their hashed owner organization id.

When a document is recorded and given its hashed attributes for sharing, the document processor may get all the documents and their hashed owner organization IDs. The processor may check if incoming document owner organization ID and each owner organization IDs are part of a partnership Merkel tree. If the IDs belong to the partnership Merkel tree for the subset of documents within an eligible organization relationship, the processor may get the required templates for logic matching. Based on evaluating the hashed attribute matching, the processor may get the list of documents (and their owners) to which the incoming document needs to be linked. Then, the processor may create the linked documents. The processor may generate a one-time pass code so that the participants can link to this document and pass it through all participants. The participants may then query the blockchain with the one-time pass code and hashed organization ID to retrieve the incoming document key. Using the document key, the participant may retrieve the shared document from the owning party (i.e., a blockchain node) and store the document on the recipient's off-chain storage.

Example embodiments may include a logic network for a privacy-preserving attribute-based document sharing in blockchain networks.

An example network includes a document processor node connected to other blockchain (BC) nodes representing document owner organizations. The document processor node may be connected to a blockchain that has a ledger for storing data to be shared among the nodes. While this example describes in detail only one document processor node, multiple such nodes may be connected to the blockchain. It should be understood that the document processor node may include additional components and that some of the components described herein may be removed and/or modified without departing from a scope of the document processor node disclosed herein. The document processor node may be a computing device or a server computer, or the like, and may include a processor, which may be a semiconductor-based microprocessor, a central processing unit (CPU), an application specific integrated circuit (ASIC), a field-programmable gate array (FPGA), and/or another hardware device. Although a single processor is described, it should be understood that the document processor node may include multiple processors, multiple cores, or the like, without departing from the scope of the document processor node system.

The document processor node may also include a non-transitory computer readable medium that may have stored thereon machine-readable instructions executable by the processor. Examples of the machine-readable instructions are further discussed below. Examples of the non-transitory computer readable medium may include an electronic, magnetic, optical, or other physical storage device that contains or stores executable instructions. For example, the non-transitory computer readable medium may be a Random Access memory (RAM), an Electrically Erasable Programmable Read-Only Memory (EEPROM), a hard disk, an optical disc, or other type of storage device.

The processor may execute the machine-readable instructions to receive a document comprising a document identifier (ID) and a document type. As discussed above, the blockchain ledger may store data to be shared among the nodes. The blockchain network may be configured to use one or more smart contracts that manage transactions for multiple participating nodes. The processor may execute the machine-readable instructions to generate at least one hashed attribute for sharing of the document based on the document ID and the document type. The processor may execute the machine-readable instructions to acquire a list of documents and corresponding document owners to be linked to the document based on the at least one hashed attribute. The processor may execute the machine-readable instructions to create a plurality of linked documents based on the list of the documents.

An example embodiment includes a logic network for a privacy-preserving attribute-based document sharing in blockchain networks.

The example network includes a user node connected to other blockchain (BC) nodes (e.g., document owner nodes) and to a document processor node. The user node may be connected to a blockchain that has a ledger for storing document-related transactions. While this example describes in detail only one user node, multiple such nodes may be connected to the blockchain. It should be understood that the user node may include additional components and that some of the components described herein may be removed and/or modified without departing from a scope of the user node disclosed herein. The user node may be a computing device or a server computer, or the like, and may include a processor, which may be a semiconductor-based microprocessor, a central processing unit (CPU), an application specific integrated circuit (ASIC), a field-programmable gate array (FPGA), and/or another hardware device. Although a single processor is described, it should be understood that the user node may include multiple processors, multiple cores, or the like, without departing from the scope of the user node system.

The user node may also include a non-transitory computer readable medium that may have stored thereon machine-readable instructions executable by the processor. Examples of the machine-readable instructions are further discussed herein. Examples of the non-transitory computer readable medium may include an electronic, magnetic, optical, or other physical storage device that contains or stores executable instructions. For example, the non-transitory computer readable medium may be a Random Access memory (RAM), an Electrically Erasable Programmable Read-Only Memory (EEPROM), a hard disk, an optical disc, or other type of storage device.

The processor may execute the machine-readable instructions to send a document request comprising a document identifier (ID) to a document processor node connected over a blockchain. As discussed above, the blockchain ledger 108 may store document-related transactions (Tx). The blockchain network may be configured to use one or more smart contracts that manage transactions for multiple participating nodes.

The processor may execute the machine-readable instructions to receive a one-time pass-code from the document processor node based on the document ID. The processor may execute the machine-readable instructions to link to the document using the one-time pass-code. The processor may execute the machine-readable instructions to retrieve the document from a document owner node.

Figure 2A:
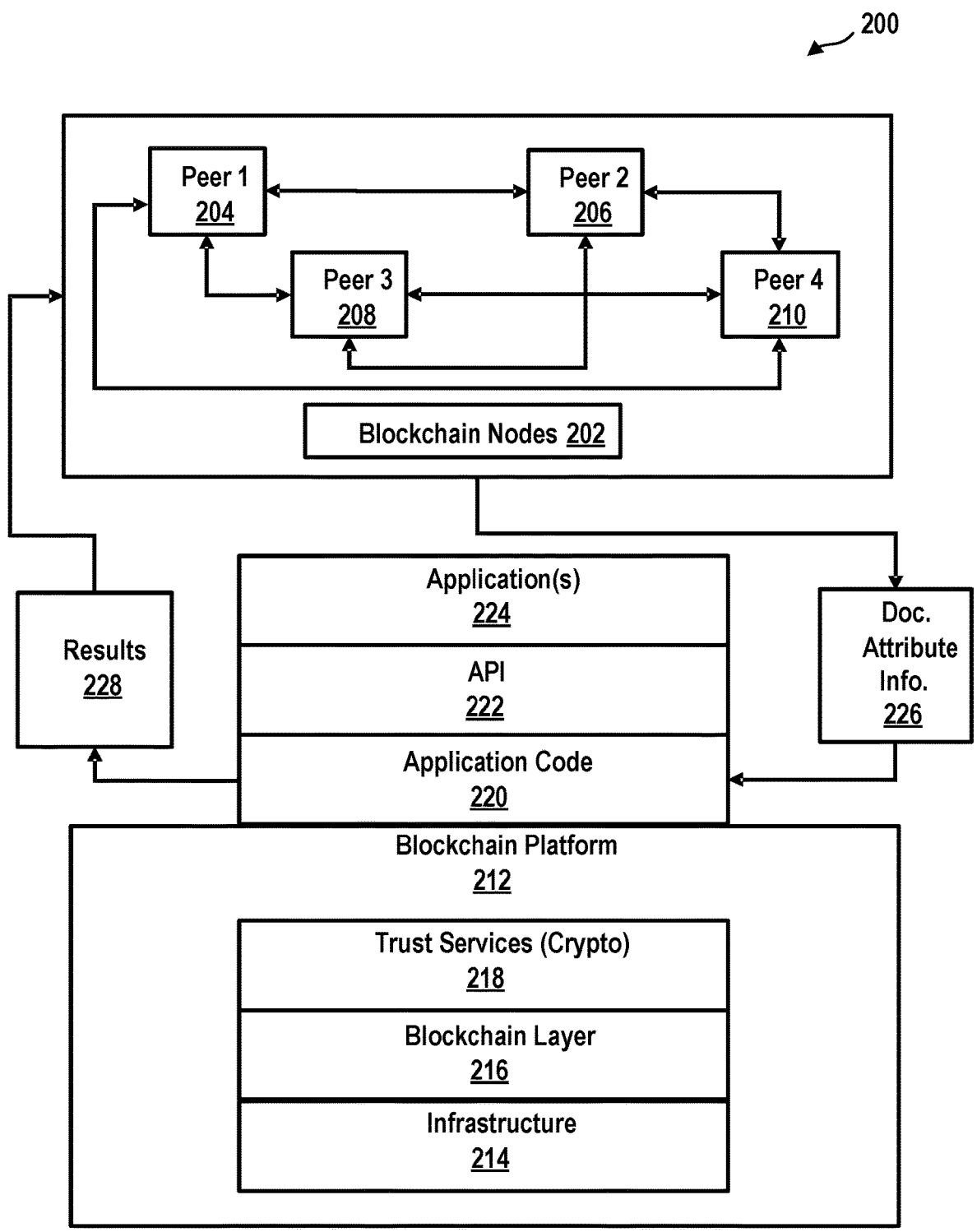
FIG. 2A is a block diagram that illustrates an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the document attribute(s) information 226 may be processed by one or more processing entities (e.g., virtual machines) included in the blockchain layer 216. The result 228 may include a plurality of linked shared documents. The physical infrastructure 214 may be utilized to retrieve any of the data or information described herein.

A smart contract may be created via a high-level application and programming language, and then written to a block in the blockchain. The smart contract may include executable code, which may be registered, stored, and/or replicated with a blockchain (e.g., distributed network of blockchain peers). A transaction is an execution of the smart contract code that can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
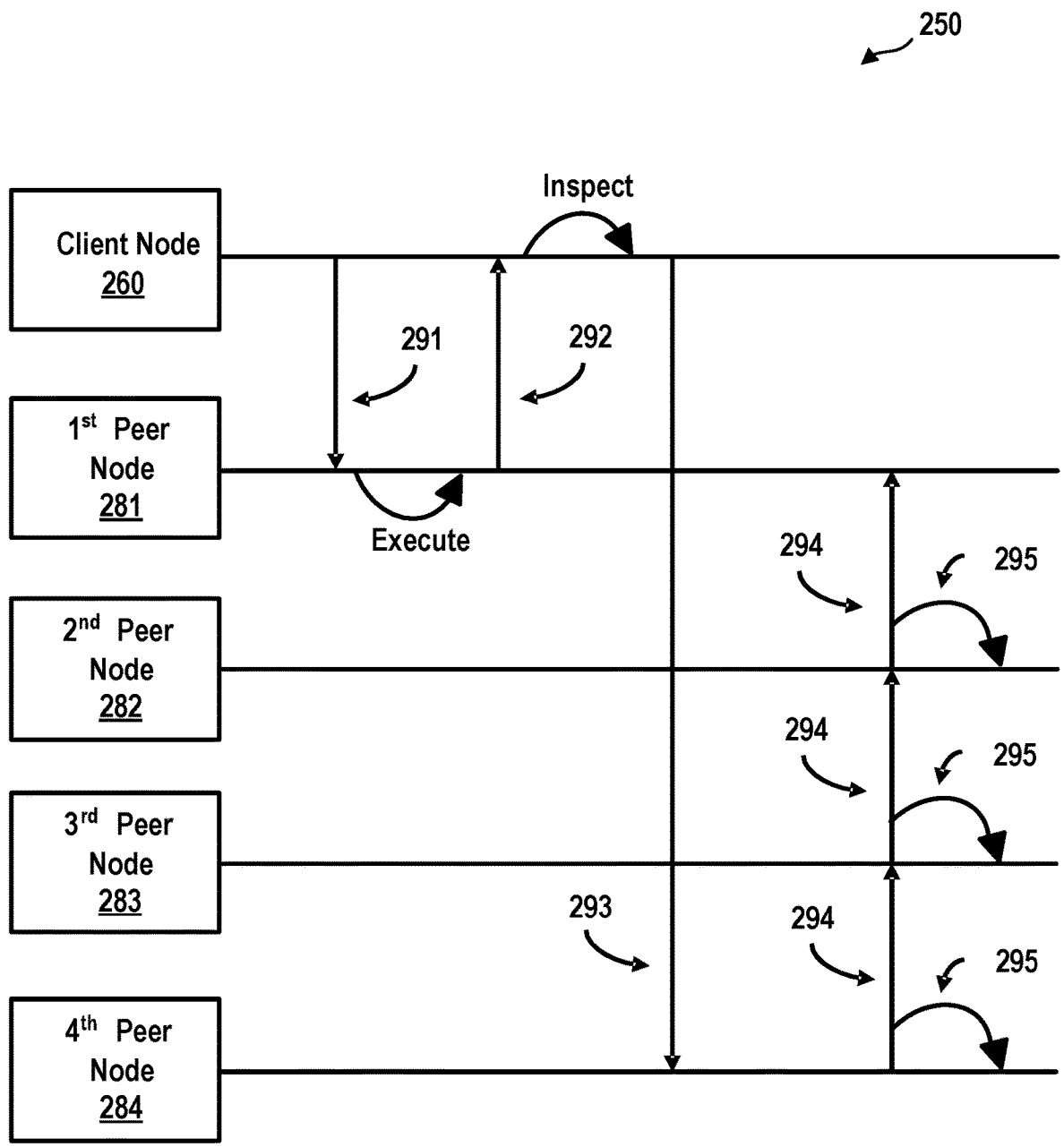
FIG. 2B is a flow diagram that illustrates a blockchain transactional flow, according to example embodiments.

FIG. 2B illustrates an example of a blockchain transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify: (a) that the transaction proposal is well formed; (b) that the transaction has not been submitted already in the past (replay-attack protection); (c) that the signature is valid; and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In operation 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in operation 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3A:
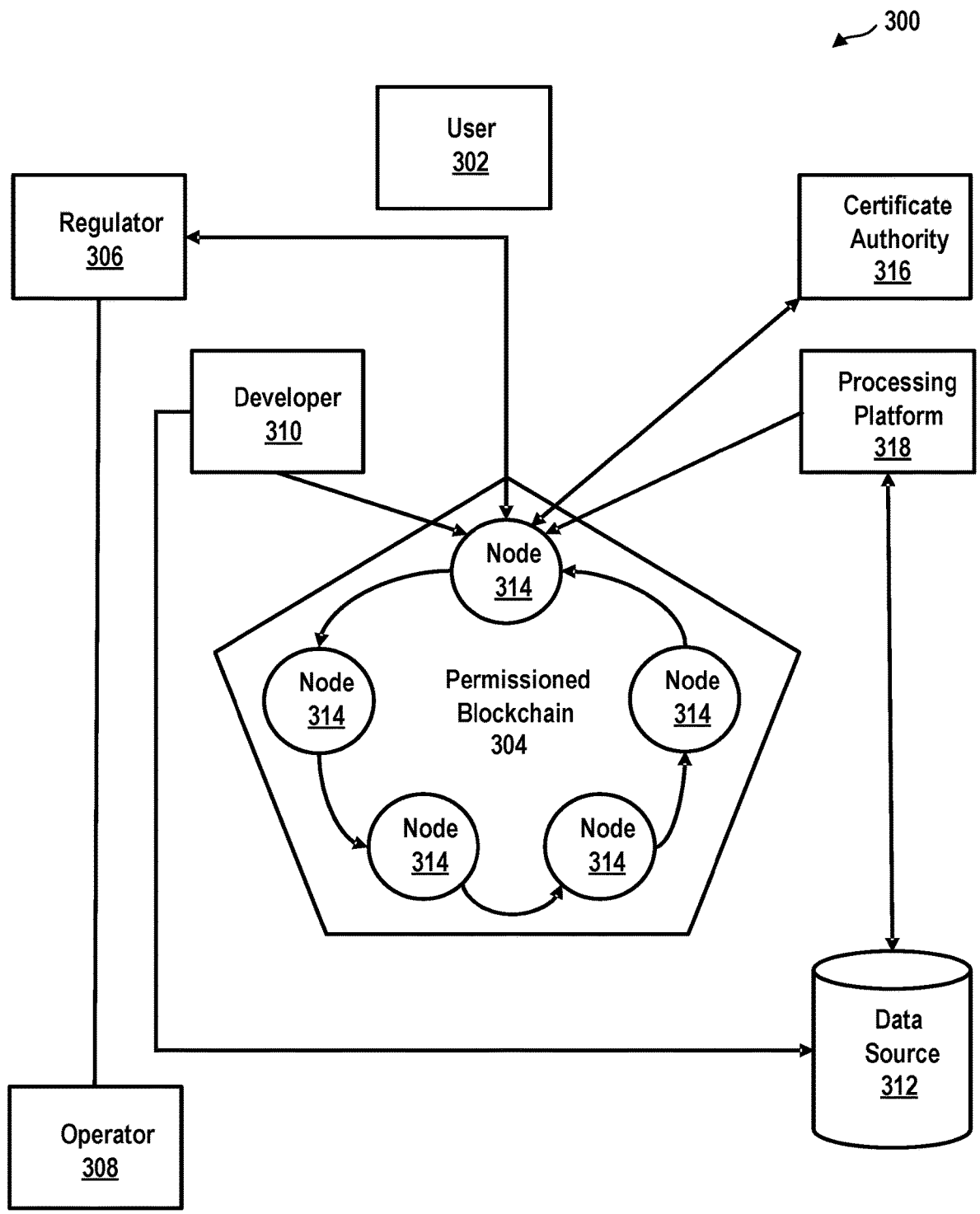
FIG. 3A is a block diagram that illustrates a permissioned network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client." An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
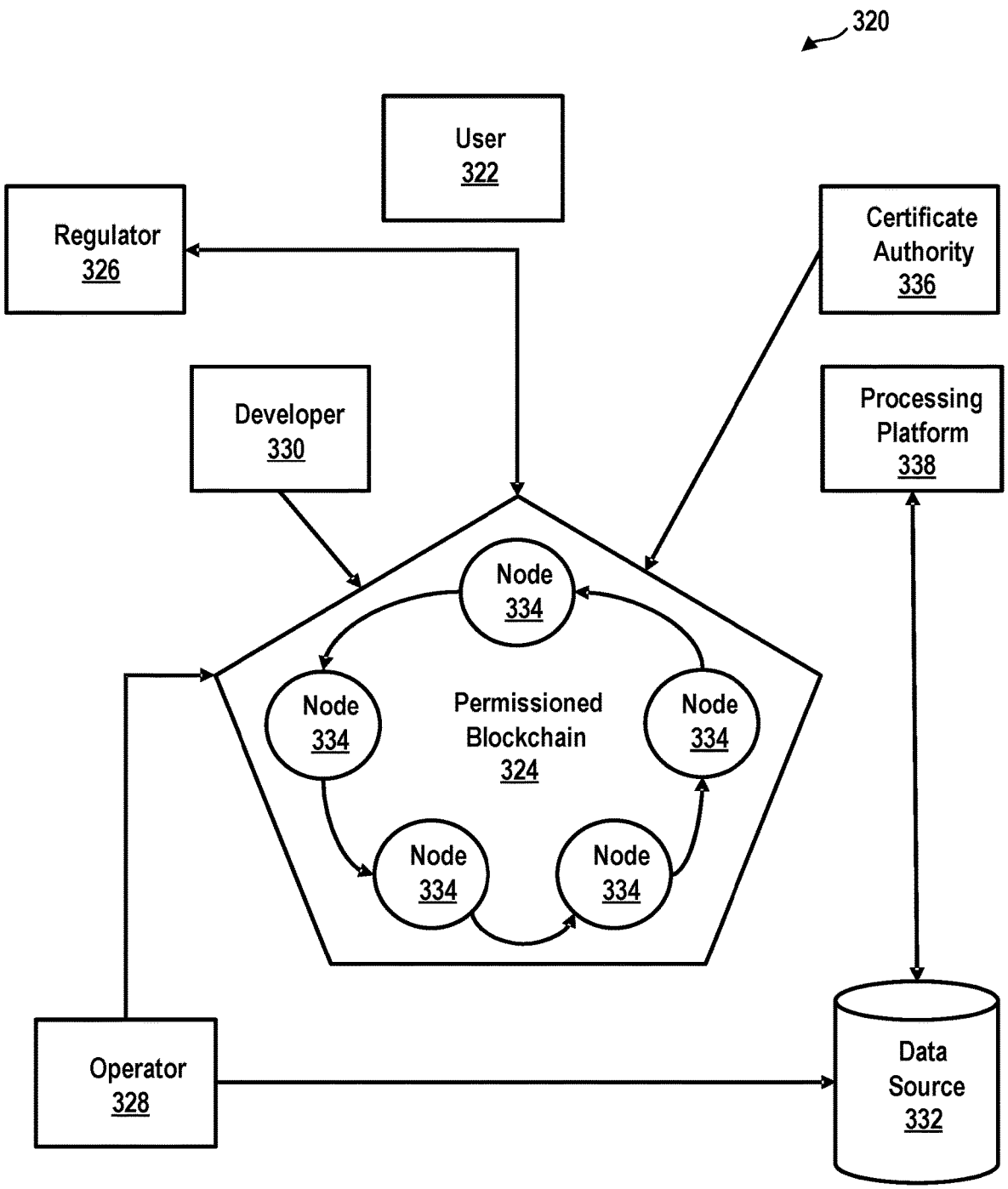
FIG. 3B is a block diagram that illustrates another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client." An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 may use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode may use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain, a user may create a personal address and begin interacting with the network, by submitting transactions, and hence adding entries to the ledger. Additionally, all parties have the choice of running a node on the system and employing the mining protocols to help verify transactions.

Figure 3C:
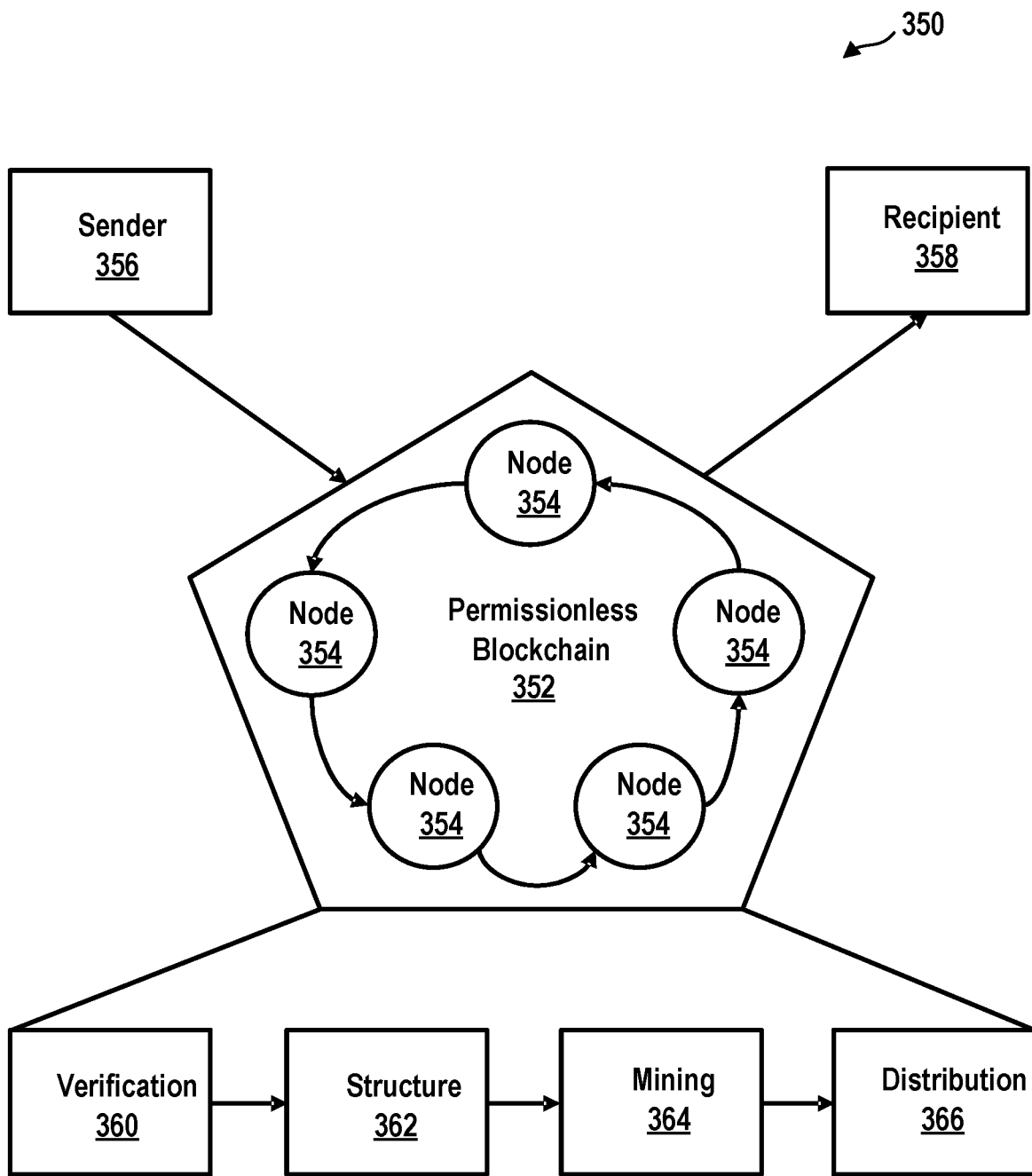
FIG. 3C is a block diagram that illustrates a permissionless network, according to example embodiments.

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW), which may be a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, such as depending on its wealth within the system, also defined as "stake." Then, a similar proof or validation process is performed by the selected/chosen node.

With mining 364, nodes try to solve the block by making incremental changes to one variable until the solution satisfies a network-wide target. This creates the PoW, thereby ensuring correct answers and demonstrating that work was performed. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352 and all nodes 354 add the block to a majority chain, which is the permissionless blockchain's 352 auditable ledger. Furthermore, the value in the transaction submitted by the sender 356 is deposited or otherwise transferred to the digital wallet of the recipient device 358.

Figure 4:
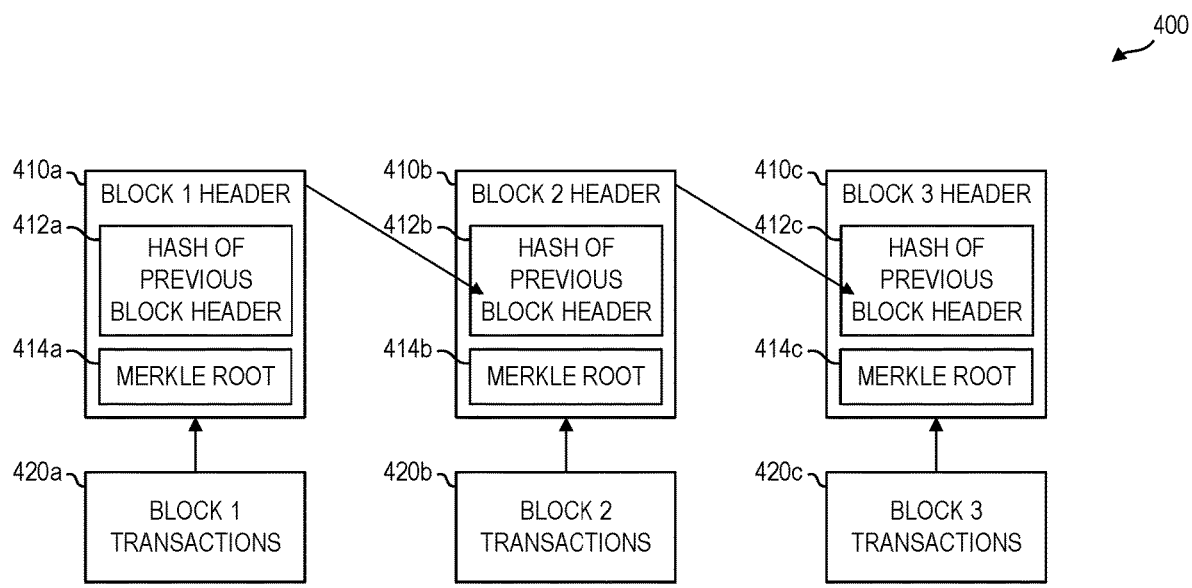
FIG. 4 is a block diagram that illustrates a basic blockchain sequence.

FIG. 4 is a block diagram that illustrates a basic blockchain sequence 400 of three transactions. The first block contains a first header 410a and a first group of transactions 420a making up the first block. The block header contains a hash 412a of the previous block header and a Merkle root 414a. The Merkle root 414a is a hash of all the hashes of all the transactions that are part of a block in a blockchain network that ensures data blocks passed between peers are whole, undamaged, and unaltered. The second block contains a second header 410b and a second group of transactions 420b making up the second block. The block header contains a hash 412b of the previous block header 410a and a Merkle root 414b. The third block contains a third header 410c and a third group of transactions 420c making up the third block. The block header contains a hash 412c of the previous block header 410b and a Merkle root 414c. The number of blocks may be extended to any feasible length and hash values may be checked/verified with relative ease.

Figure 5A:
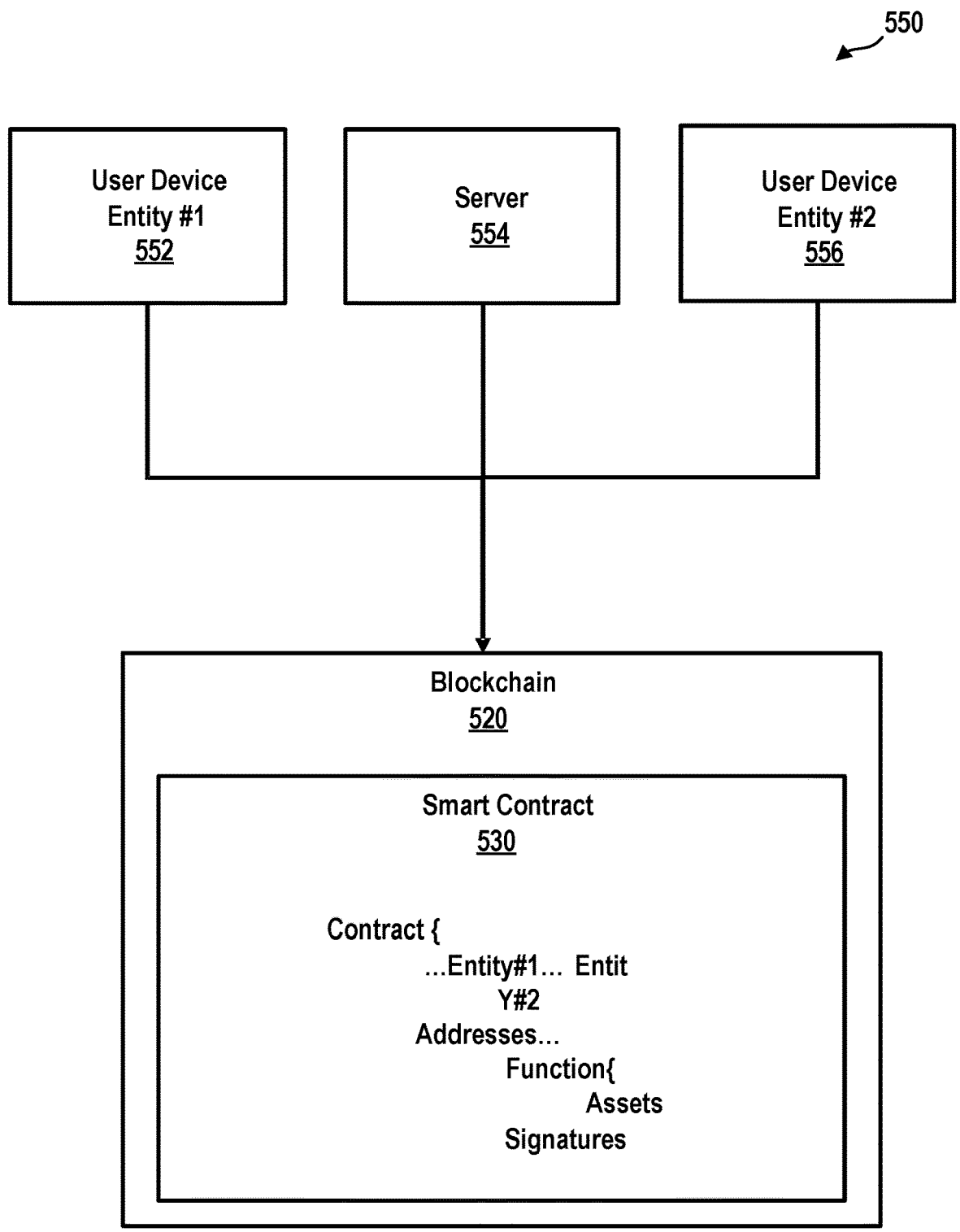
FIG. 5A is a block diagram that illustrates a further example system configured to utilize a smart contract, according to example embodiments.

FIG. 5A illustrates an example system configured to utilize a smart contract configuration among contracting parties and a mediating server configured to enforce the smart contract terms on the blockchain according to example embodiments. Referring to FIG. 5C, the configuration 550 may represent a communication session, an asset transfer session, or other process or procedure that is driven by a smart contract 530 that explicitly identifies one or more user devices 552 and/or 556. The execution, operations, and results of the smart contract execution may be managed by a server 554. Content of the smart contract 530 may require digital signatures by one or more of the entities 552 and 556 that are parties to the smart contract transaction. The results of the smart contract execution may be written to a blockchain 520 as a blockchain transaction. The smart contract 530 resides on the blockchain 520, which may reside on one or more computers, servers, processors, memories, and/or wireless communication devices.

Figure 5B:
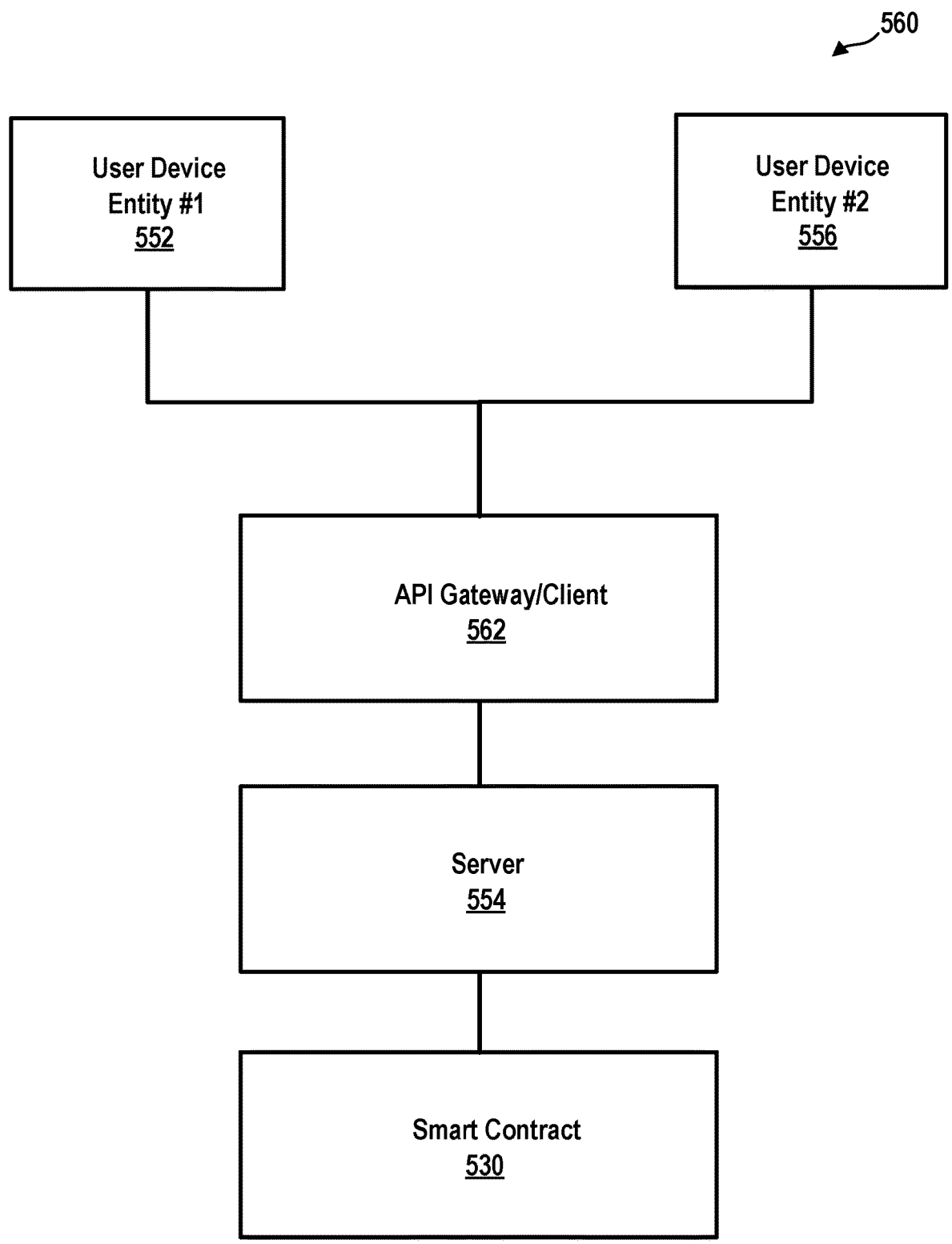
FIG. 5B is a block diagram that illustrates yet another example system configured to utilize a blockchain, according to example embodiments.

FIG. 5B illustrates a system 560 including a blockchain, according to example embodiments. Referring to the example of FIG. 5B, an application programming interface (API) gateway 562 provides a common interface for accessing blockchain logic (e.g., smart contract 530 or other chaincode) and data (e.g., distributed ledger, etc.). In this example, the API gateway 562 is a common interface for performing transactions (invoke, queries, etc.) on the blockchain by connecting one or more entities 552 and 556 to a blockchain peer (i.e., server 554). Here, the server 554 is a blockchain network peer component that holds a copy of the world state and a distributed ledger allowing clients 552 and 556 to query data on the world state, as well as submit transactions into the blockchain network where, depending on the smart contract 530 and endorsement policy, endorsing peers will run the smart contracts 530.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An example storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 6A:
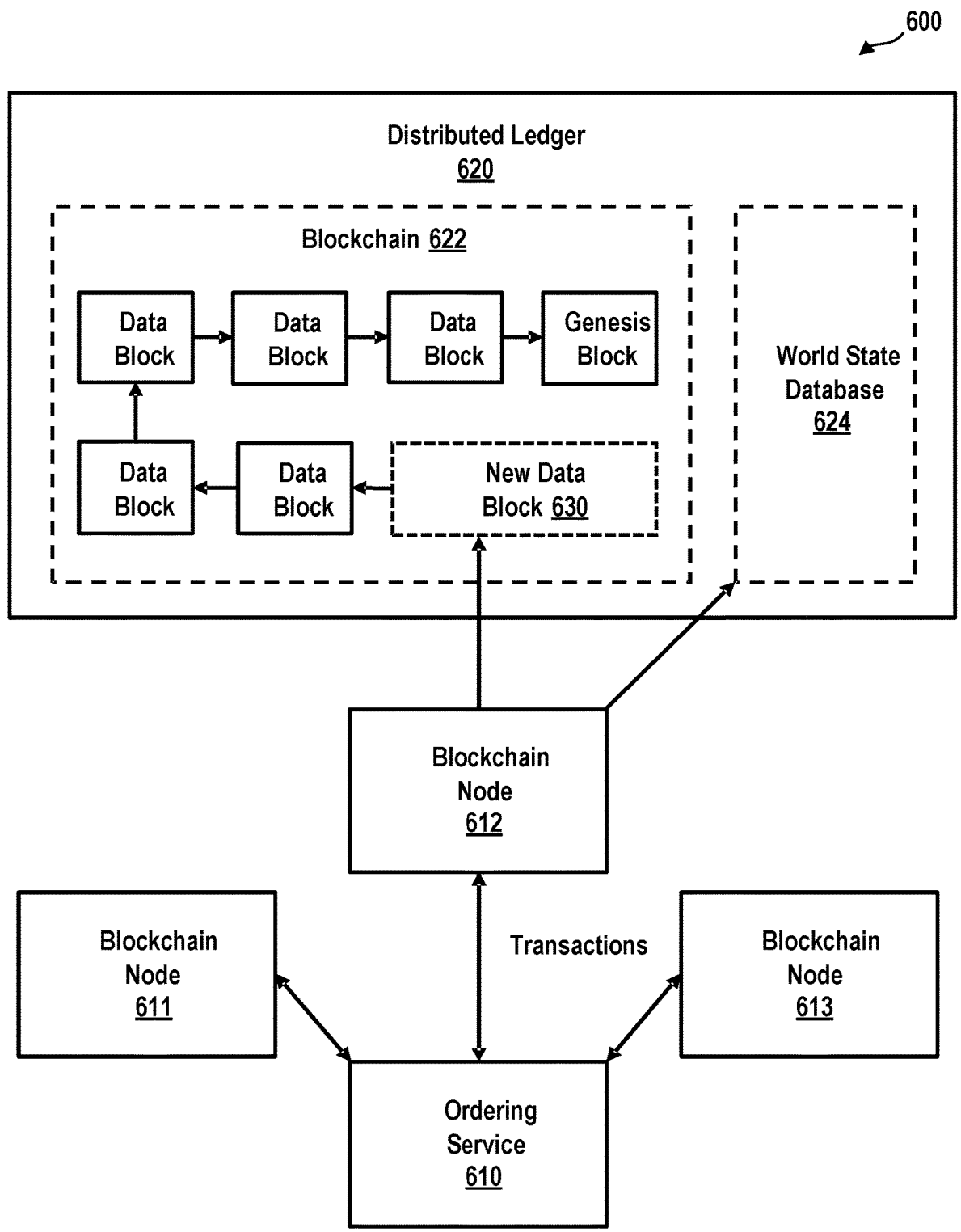
FIG. 6A is a block diagram that illustrates a process for a new block being added to a distributed ledger, according to example embodiments.
Figure 6B:
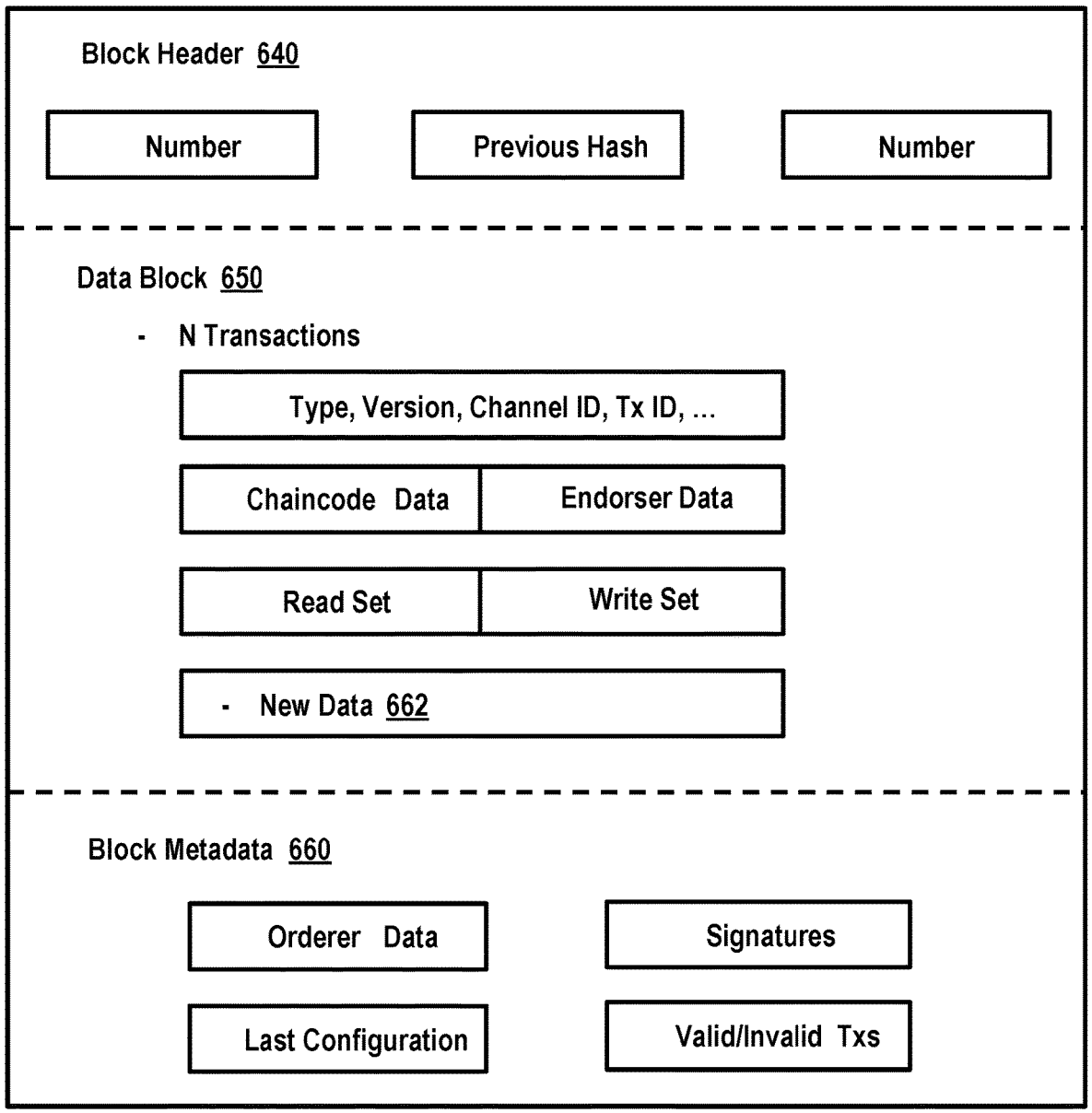
FIG. 6B is a block diagram that illustrates contents of a new data block, according to example embodiments.

FIG. 6A illustrates a process 600 of a new block being added to a distributed ledger 620, according to example embodiments, and FIG. 6B illustrates contents of a new data block structure 630 for blockchain, according to example embodiments. The new data block 630 may contain document linking data.

Referring to FIG. 6A, clients (not shown) may submit transactions to blockchain nodes 611, 612, and/or 613. Clients may be instructions received from any source to enact activity on the blockchain 620, 622. As an example, clients may be applications that act on behalf of a requester, such as a device, person or entity to propose transactions for the blockchain. The plurality of blockchain peers (e.g., blockchain nodes 611, 612, and 613) may maintain a state of the blockchain network and a copy of the distributed ledger 620. Different types of blockchain nodes/peers may be present in the blockchain network including endorsing peers which simulate and endorse transactions proposed by clients and committing peers which verify endorsements, validate transactions, and commit transactions to the distributed ledger 620. In this example, the blockchain nodes 611, 612, and 613 may perform the role of endorser node, committer node, or both.

The distributed ledger 620 includes a blockchain which stores immutable, sequenced records in blocks, and a state database 624 (current world state) maintaining a current state of the blockchain 622. One distributed ledger 620 may exist per channel and each peer maintains its own copy of the distributed ledger 620 for each channel of which they are a member. The blockchain 622 is a transaction log, structured as hash-linked blocks where each block contains a sequence of N transactions. Blocks may include various components such as shown in FIG. 6B. The linking of the blocks (shown by arrows in FIG. 6A) may be generated by adding a hash of a prior block's header within a block header of a current block. In this way, all transactions on the blockchain 622 are sequenced and cryptographically linked together preventing tampering with blockchain data without breaking the hash links. Furthermore, because of the links, the latest block in the blockchain 622 represents every transaction that has come before it. The blockchain 622 may be stored on a peer file system (local or attached storage), which supports an append-only blockchain workload.

The current state of the blockchain 622 and the distributed ledger 620 may be stored in the state database 624. Here, the current state data represents the latest values for all keys ever included in the chain transaction log of the blockchain 622. Chaincode invocations execute transactions against the current state in the state database 624. To make these chaincode interactions extremely efficient, the latest values of all keys are stored in the state database 624. The state database 624 may include an indexed view into the transaction log of the blockchain 622, and can therefore be regenerated from the chain at any time. The state database 624 may automatically be recovered (or generated if needed) upon peer startup, before transactions are accepted.

Endorsing nodes receive transactions from clients and endorse the transaction based on simulated results. Endorsing nodes hold smart contracts, which simulate the transaction proposals. When an endorsing node endorses a transaction, the endorsing node creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 610.

The ordering service 610 accepts endorsed transactions, orders them into a block, and delivers the blocks to the committing peers. For example, the ordering service 610 may initiate a new block when a threshold of transactions has been reached, a timer times out, or another condition. In the example of FIG. 6A, blockchain node 612 is a committing peer that has received a new data new data block 630 for storage on blockchain 620, 622. The first block in the blockchain may be referred to as a genesis block, which includes information about the blockchain, its members, the data stored therein, etc.

The ordering service 610 may be made up of a cluster of orderers. The ordering service 610 does not process transactions, smart contracts, or maintain the shared ledger. Rather, the ordering service 610 may accept the endorsed transactions and specifies the order in which those transactions are committed to the distributed ledger 620. The architecture of the blockchain network may be designed such that the specific implementation of 'ordering' (e.g., Solo, Kafka, BFT, etc.) becomes a pluggable component.

Transactions are written to the distributed ledger 620 in a consistent order. The order of transactions is established to ensure that the updates to the state database 624 are valid when they are committed to the network. Unlike a cryptocurrency blockchain network (e.g., Bitcoin, etc.), where ordering occurs through the solving of a cryptographic puzzle, or mining, in this example, the parties of the distributed ledger 620 may choose the ordering mechanism that best suits that network.

When the ordering service 610 initializes a new data block 630, the new data block 630 may be broadcast to committing peers (e.g., blockchain nodes 611, 612, and 613). In response, each committing peer validates the transaction within the new data block 630 by checking to make sure that the read set and the write set still match the current world state in the state database 624. Specifically, the committing peer may determine whether the read data that existed when the endorsers simulated the transaction is identical to the current world state in the state database 624. When the committing peer validates the transaction, the transaction is written to the blockchain 622 on the distributed ledger 620, and the state database 624 is updated with the write data from the read-write set. If a transaction fails, that is, if the committing peer finds that the read-write set does not match the current world state in the state database 624, the transaction ordered into a block will still be included in that block, but it will be marked as invalid, and the state database 624 will not be updated.

Referring to FIG. 6B, a new data block 630 (also referred to as a data block) that is stored on the blockchain 622 of the distributed ledger 620 may include multiple data segments such as a block header 640, block data 650, and block metadata 660. It should be appreciated that the various depicted blocks and their contents, such as new data block 630 and its contents shown in FIG. 6B, are merely examples and are not meant to limit the scope of the example embodiments. The new data block 630 may store transactional information of N transaction(s) (e.g., 1, 10, 100, 500, 1000, 2000, 3000, etc.) within the block data 650. The new data block 630 may also include a link to a previous block (e.g., on the blockchain 622 in FIG. 6A) within the block header 640. In particular, the block header 640 may include a hash of a previous block's header. The block header 640 may also include a unique block number, a hash of the block data 650 of the new data block 630, and the like. The block number of the new data block 630 may be unique and assigned in various orders, such as an incremental/sequential order starting from zero.

The block data 650 may store transactional information of each transaction that is recorded within the new data block 630. For example, the transaction data may include one or more fields selected from a type of the transaction, a version, a timestamp, a channel ID of the distributed ledger 620, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, etc. The transaction data may be stored for each of the N transactions.

In some embodiments, the block data 650 may also store new data 662, which may add additional information to the hash-linked chain of blocks in the blockchain 622. The additional information may include one or more of the operations, features, processes, and/or actions described or depicted herein. Accordingly, the new data 662 can be stored in an immutable log of blocks on the distributed ledger 620. Some of the benefits of storing such new data 662 are reflected in the various embodiments disclosed and depicted herein. Although in FIG. 6B the new data 662 is depicted in the block data 650, it could also be located in the block header 640 or the block metadata 660. The new data 662 may include a document composite key that is used for linking the documents within an organization.

The block metadata 660 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, etc. The signature, the last configuration block, and the orderer metadata may be added by the ordering service 610. Meanwhile, a committer of the block (such as blockchain node 612) may add validity/invalidity information based on an endorsement policy, verification of read/write sets, etc. The transaction filter may include a byte array of a size equal to the number of transactions in the block data 650 and a validation code identifying whether a transaction was valid/invalid.

Figure 6C:
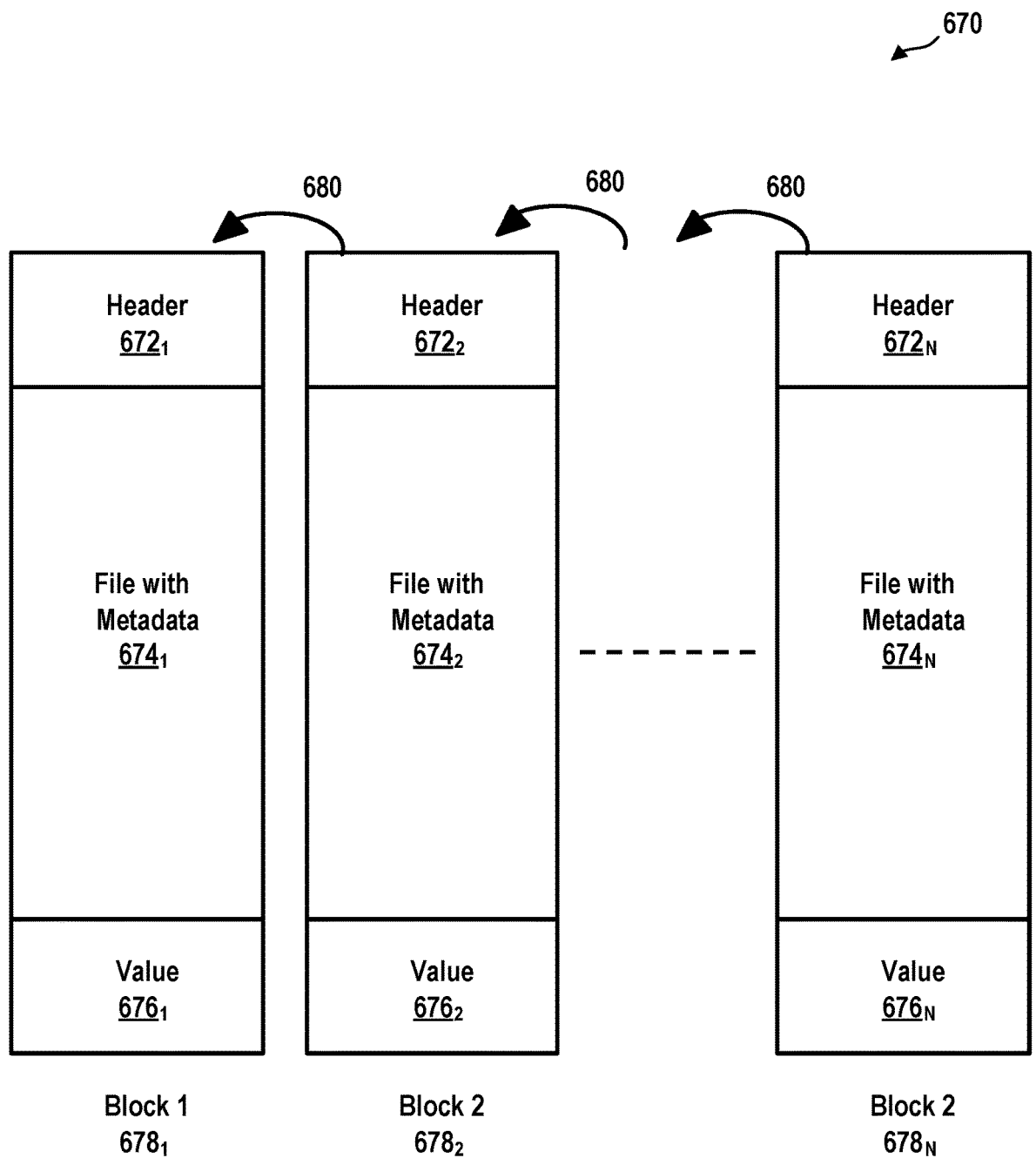
FIG. 6C is a block diagram that illustrates a blockchain for digital content, according to example embodiments.

FIG. 6C illustrates an embodiment of a blockchain 670 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value ... Content |
| . | . |
| . | . |
| . | . |
| Block N Hash Value | Block N Hash Value ... Content |

In the example embodiment of FIG. 6C, the blockchain 670 includes a number of blocks $678_1$, $678_2$, ... $678_N$ cryptographically linked in an ordered sequence, where $N \geq 1$. The encryption used to link the blocks $678_1$, $678_2$, ... $678_N$ may be any of a number of keyed or un-keyed Hash functions. In one embodiment, the blocks $678_1$, $678_2$, ... $678_N$ are subject to a hash function that produces n-bit alphanumeric outputs (where n is 256 or another number) from inputs that are based on information in the blocks. Examples of such a hash function include, but are not limited to: a SHA-type (SHA stands for Secured Hash Algorithm) algorithm, Merkle-Damgard algorithm, HAIFA algorithm, Merkle-tree algorithm, nonce-based algorithm, a non-collision-resistant PRF algorithm, etc. In another embodiment, the blocks $678_1$, $678_2$, ... , $678_N$ may be cryptographically linked by a function that is different from a hash function. For purposes of illustration, the following description is made with reference to a hash function, e.g., SHA-2.

Each of the blocks $678_1$, $678_2$, ..., $678_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $678_1$ in the blockchain is referred to as the genesis block and includes the header $672_1$, original file $674_1$, and an initial value $676_1$. The hashing scheme used for the genesis block, and indeed in all subsequent blocks, may vary. For example, all the information in the first block $678_1$ may be hashed together and at one time, or each or a portion of the information in the first block $678_1$ may be separately hashed and then a hash of the separately hashed portions may be performed.

The header $672_1$ may include one or more initial parameters, which, for example, may include a version number, timestamp, nonce, root information, difficulty level, consensus protocol, duration, media format, source, descriptive keywords, and/or other information associated with original file $674_1$ and/or the blockchain. The header $672_1$ may be generated automatically (e.g., by blockchain network managing software) or manually by a blockchain participant. Unlike the header in other blocks $678_2$ to $678_N$ in the blockchain, the header $672_1$ in the genesis block does not reference a previous block, simply because there is no previous block.

The original file $674_1$ in the genesis block may be, for example, data as captured by a device with or without processing prior to its inclusion in the blockchain. The original file $674_1$ is received through the interface of the system from the device, media source, or node. The original file $674_1$ is associated with metadata, which, for example, may be generated by a user, the device, and/or the system processor, either manually or automatically. The metadata may be included in the first block $678_1$ in association with the original file $674_1$.

The value $676_1$ in the genesis block is an initial value generated based on one or more unique attributes of the original file $674_1$. In one embodiment, the one or more unique attributes may include the hash value for the original file $674_1$, metadata for the original file $674_1$, and other information associated with the file. In one implementation, the initial value $676_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata.

The other blocks $678_2$ to $678_N$ in the blockchain also have headers, files, and values. However, unlike the first block $672_1$, each of the headers $672_2$ to $672_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 680, to establish an auditable and immutable chain-of-custody.

Each of the header $672_2$ to $672_N$ in the other blocks may also include other information, e.g., version number, timestamp, nonce, root information, difficulty level, consensus protocol, and/or other parameters or information associated with the corresponding files and/or the blockchain in general.

The files $674_2$ to $674_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing that involves analyzing a file may include, for example, appending, including, or otherwise associating various analytics, statistics, or other information associated with the file.

The values in each of the other blocks $676_2$ to $676_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 6D:
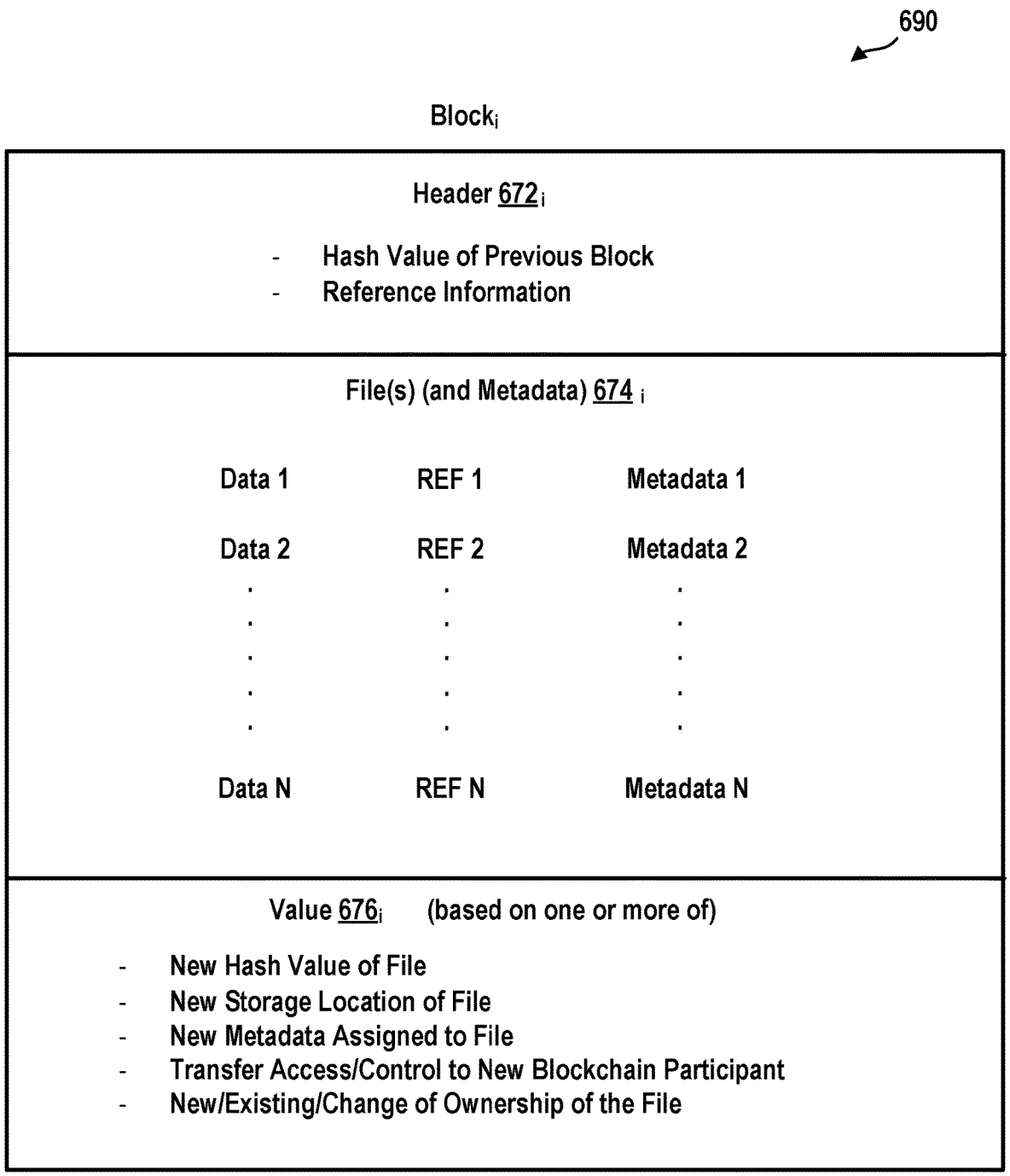
FIG. 6D is a block diagram that illustrates a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment:

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 6D illustrates an embodiment of a block which may represent the structure of the blocks in the blockchain 690 in accordance with one embodiment. The block, $Block_i$, includes a header $672_i$, a file $674_i$, and a value $676_i$.

The header $672_i$ includes a hash value of a previous block $Block_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $674_i$ includes a plurality of data, such as Data 1, Data 2, . . . , Data N in sequence. The data are tagged with Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, . . . , $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $676_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 670 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 7A:
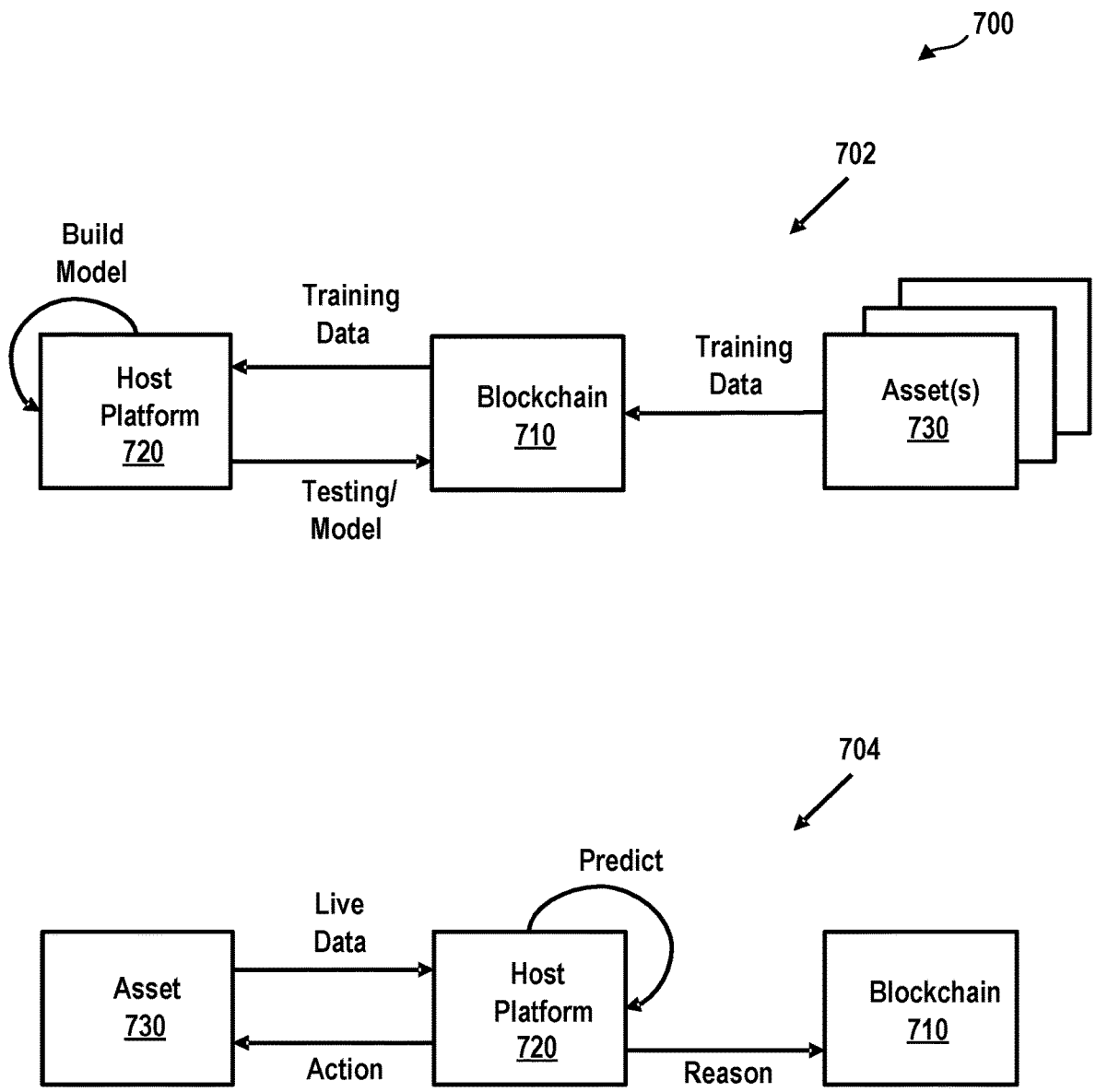
FIG. 7A is a block diagram that illustrates an example blockchain which stores machine learning (artificial intelligence) data, according to example embodiments.
Figure 7B:
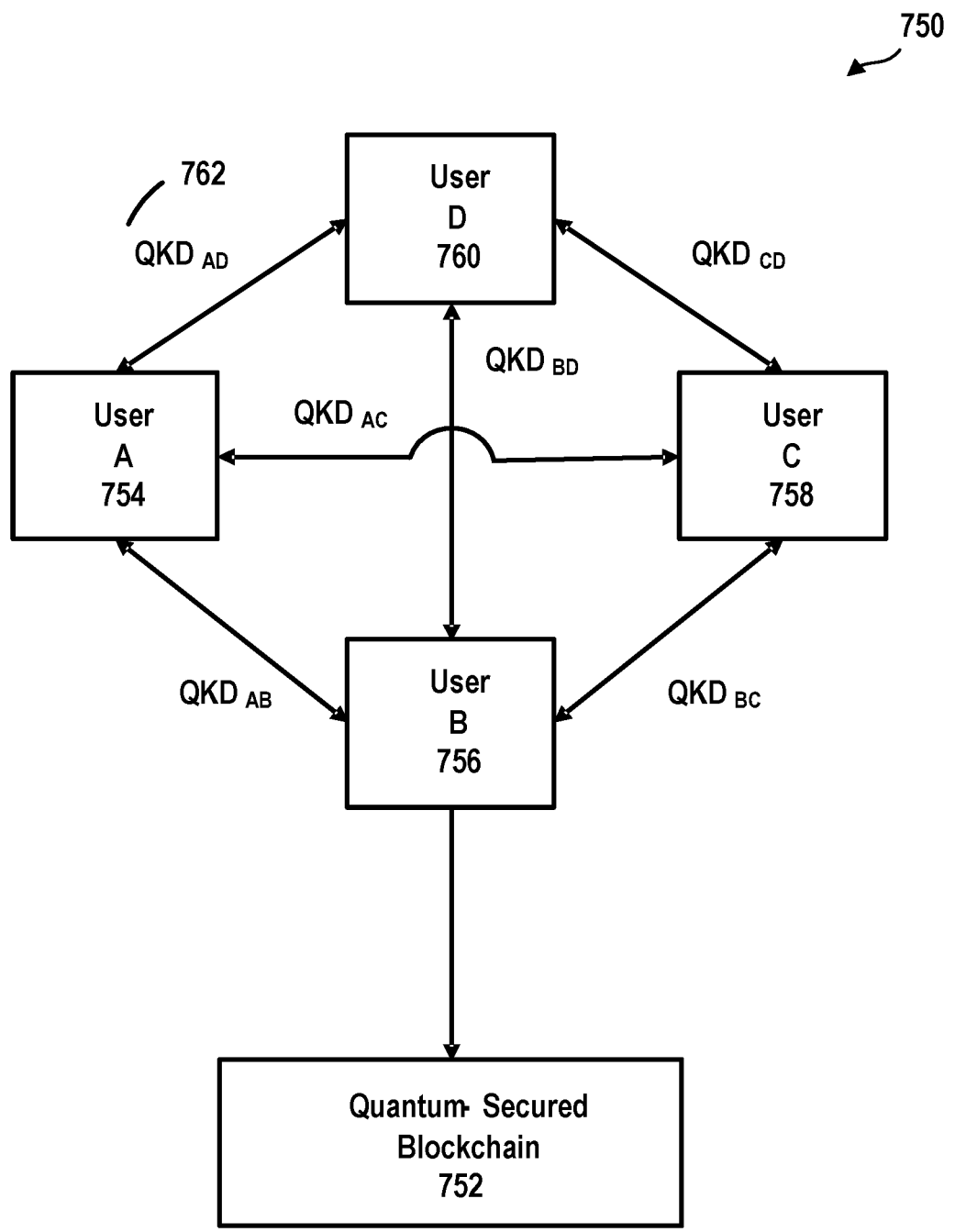
FIG. 7B is a block diagram that illustrates an example quantum-secure blockchain, according to example embodiments.

FIGS. 7A and 7B illustrate additional examples of use cases for blockchain which may be incorporated and used herein. In particular, FIG. 7A illustrates an example 700 of a blockchain 710 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 7A, a host platform 720 builds and deploys a machine learning model for predictive monitoring of assets 730. Here, the host platform 720 may be a cloud platform, an industrial server, a web server, a personal computer, a user device, and the like. Assets 730 can be any type of asset. These assets 730 may include physical assets (e.g., machine or equipment, etc.) such as an aircraft, locomotive, turbine, medical machinery and equipment, oil and gas equipment, boats, ships, vehicles, and the like. As another example, the assets 730 may include non-tangible assets such as stocks, currency, digital coins, insurance, bills of lading, warehouse receipts, or the like.

The blockchain 710 can be used to significantly improve both a training process 702 of the machine learning model and a predictive process 704 based on a trained machine learning model. For example, in 702, rather than requiring a data scientist/engineer or other user to collect the data, historical data may be stored by the assets 730 themselves (or through an intermediary, not shown) on the blockchain 710. This can significantly reduce the collection time needed by the host platform 720 when performing predictive model training. For example, using smart contracts, data can be directly and reliably transferred straight from its place of origin to the blockchain 710. By using the blockchain 710 to ensure the security and ownership of the collected data, smart contracts may directly send the data from the assets to the individuals that use the data for building a machine learning model. This allows for sharing of data among the assets 730.

The collected data may be stored in the blockchain 710 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure. Adding IoT devices that write directly to the blockchain can, in certain cases (i.e. supply chain, healthcare, logistics, etc.), increase both the frequency and accuracy of the data being recorded.

Furthermore, training of the machine learning model on the collected data may take rounds of refinement and testing by the host platform 720. Each round may be based on additional data or data that was not previously considered to help expand the knowledge of the machine learning model. In operation 702, the different training and testing steps (and the data associated therewith) may be stored on the blockchain 710 by the host platform 720. Each refinement of the machine learning model (e.g., changes in variables, weights, etc.) may be stored on the blockchain 710. This provides verifiable proof of how the model was trained and what data was used to train the model. Furthermore, when the host platform 720 has achieved a finally trained model, the resulting model may be stored on the blockchain 710.

After the model has been trained, it may be deployed to a live environment, where it can make predictions/decisions based on the execution of the final trained machine learning model. For example, in operation 704, the machine learning model may be used for condition-based maintenance (CBM) for an asset such as an aircraft, a wind turbine, a healthcare machine, and the like. In this example, data fed back from the asset 730 may be input the machine learning model and used to make event predictions such as failure events, error codes, and the like. Determinations made by the execution of the machine learning model at the host platform 720 may be stored on the blockchain 710 to provide auditable/verifiable proof. As one non-limiting example, the machine learning model may predict a future breakdown/failure to a part of the asset 730 and create alert or a notification to replace the part. The data behind this decision may be stored by the host platform 720 on the blockchain 710. In one embodiment the features and/or the actions described and/or depicted herein can occur on or with respect to the blockchain 710.

New transactions for a blockchain can be gathered together into a new block and added to an existing hash value. This is then encrypted to create a new hash for the new block. This is added to the next list of transactions when they are encrypted, and so on. The result is a chain of blocks that each contain the hash values of all preceding blocks. Computers that store these blocks regularly compare their hash values to ensure that they are all in agreement. Any computer that does not agree, discards the records that are causing the problem. This approach is good for ensuring tamper-resistance of the blockchain, but it is not perfect.

One way to game this system is for a dishonest user to change the list of transactions in their favor, but in a way that leaves the hash unchanged. This can be done by brute force, in other words by changing a record, encrypting the result, and seeing whether the hash value is the same. And if not, trying again and again and again until it finds a hash that matches. The security of blockchains is based on the belief that ordinary computers can only perform this kind of brute force attack over time scales that are entirely impractical, such as the age of the universe. By contrast, quantum computers are much faster (1000 s of times faster) and consequently pose a much greater threat.

FIG. 7B illustrates an example 750 of a quantum-secure blockchain 752 that implements quantum key distribution (QKD) to protect against a quantum computing attack. In this example, blockchain users can verify each other's identities using QKD. This sends information using quantum particles such as photons, which cannot be copied by an eavesdropper without destroying them. In this way, a sender and a receiver through the blockchain can be sure of each other's identity.

In the example of FIG. 7B, four users are present 754, 756, 758, and 760. Each of pair of users may share a secret key 762 (i.e., a QKD) between themselves. Since there are four nodes in this example, six pairs of nodes exist, and therefore six different secret keys 762 are used including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the blockchain 752 is based on two procedures: (i) creation of transactions; and (ii) construction of blocks that aggregate the new transactions. New transactions may be created similar to a traditional blockchain network. Each transaction may contain information about a sender, a receiver, a time of creation, an amount (or value) to be transferred, a list of reference transactions that justifies the sender has funds for the operation, etc. This transaction record is then sent to all other nodes, where it is entered into a pool of unconfirmed transactions. Here, two parties (i.e., a pair of users from among 754-760) authenticate the transaction by providing their shared secret key 762 (QKD). This quantum signature can be attached to every transaction making it exceedingly difficult to tamper with. Each node checks their entries with respect to a local copy of the blockchain 752 to verify that each transaction has sufficient funds. However, the transactions are not yet confirmed.

Rather than perform a traditional mining process on the blocks, the blocks may be created in a decentralized manner using a broadcast protocol. At a predetermined period of time (e.g., seconds, minutes, hours, etc.) the network may apply the broadcast protocol to any unconfirmed transaction, thereby to achieve a *Byzantine* agreement (consensus) regarding a correct version of the transaction. For example, each node may possess a private value (transaction data of that particular node). In a first round, nodes transmit their private values to each other. In subsequent rounds, nodes communicate the information they received in the previous round from other nodes. Here, honest nodes are able to create a complete set of transactions within a new block. This new block can be added to the blockchain 752. In one embodiment the features and/or the actions described and/or depicted herein can occur on or with respect to the blockchain 752.

Figure 8:
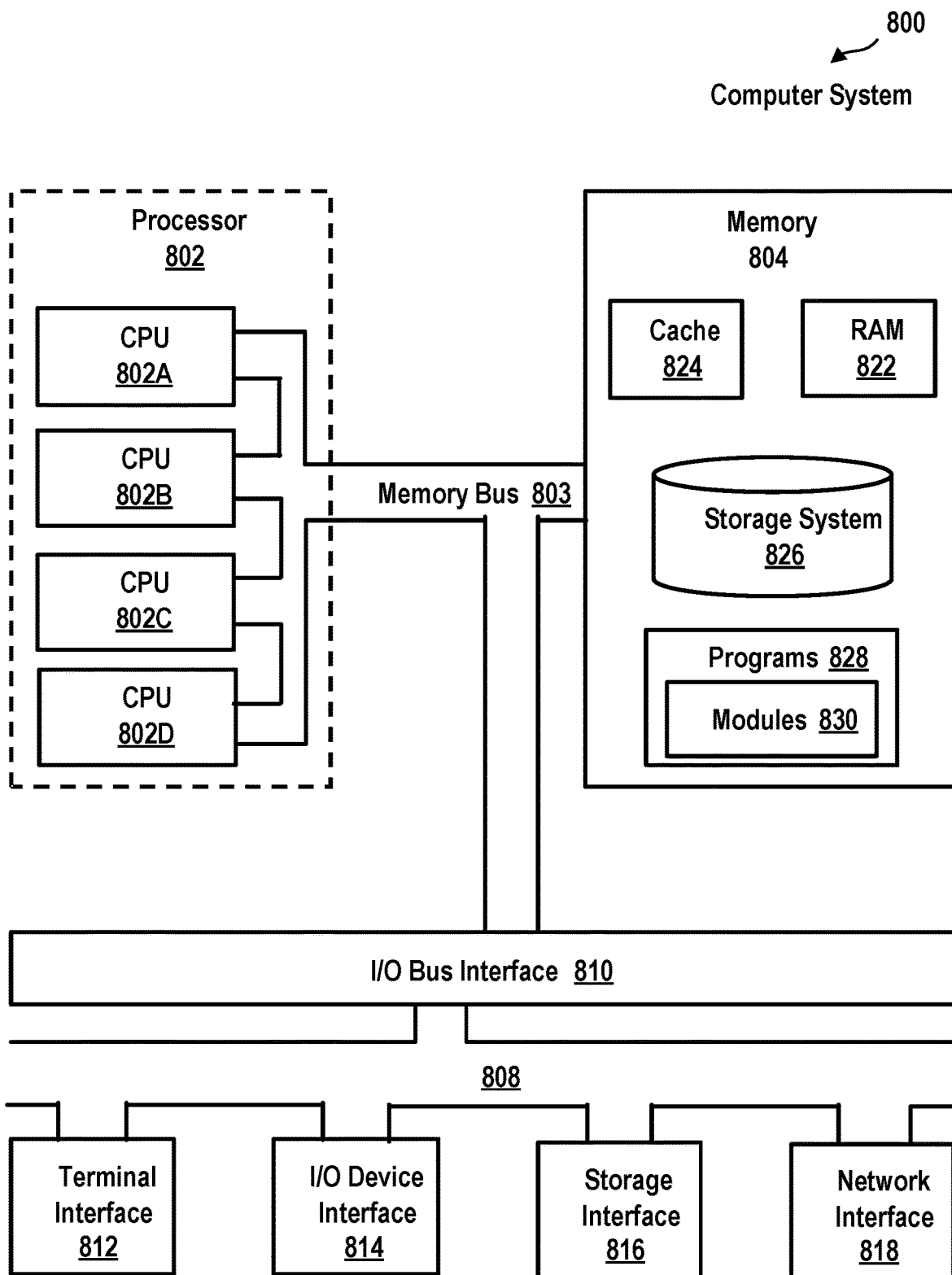
FIG. 8 is a block diagram that illustrates a high-level block diagram of an example computer system that may be used in implementing one or more of the methods, tools, and modules, and any related functions, described herein, in accordance with embodiments of the present disclosure.

Referring now to FIG. 8, shown is a high-level block diagram of an example computer system 800 that may be used in implementing one or more of the methods, tools, and modules, and any related functions, described herein (e.g., using one or more processor circuits or computer processors of the computer), in accordance with embodiments of the present disclosure. This computer system may, in some embodiments, be a DPS 10 as described above. In some embodiments, the major components of the computer system 800 may comprise one or more CPUs 802, a memory subsystem 804, a terminal interface 812, a storage interface 816, an I/O (Input/Output) device interface 814, and a network interface 818, all of which may be communicatively coupled, directly or indirectly, for inter-component communication via a memory bus 803, an I/O bus 808, and an I/O bus interface unit 810.

The computer system 800 may contain one or more general-purpose programmable central processing units (CPUs) 802A, 802B, 802C, and 802D, herein generically referred to as the CPU 802. In some embodiments, the computer system 800 may contain multiple processors typical of a relatively large system; however, in other embodiments the computer system 800 may alternatively be a single CPU system. Each CPU 802 may execute instructions stored in the memory subsystem 804 and may include one or more levels of on-board cache.

System memory 804 may include computer system readable media in the form of volatile memory, such as random access memory (RAM) 822 or cache memory 824. Computer system 800 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 800 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 800 may be a multi-user mainframe computer system, a single-user system, or a server computer or similar device that has little or no direct user interface, but receives requests from other computer systems (clients). Further, in some embodiments, the computer system 800 may be implemented as a desktop computer, portable computer, laptop or notebook computer, tablet computer, pocket computer, telephone, smartphone, network switches or routers, or any other appropriate type of electronic device.

FIG. 8 depicts the representative major components of an example computer system 800. In some embodiments, however, individual components may have greater or lesser complexity than as represented in FIG. 8, components other than or in addition to those shown in FIG. 8 may be present, and the number, type, and configuration of such components may vary.

As discussed in more detail herein, some or all of the operations of some of the embodiments of methods described herein may be performed in alternative orders or may not be performed at all; furthermore, multiple operations may occur at the same time or as an internal part of a larger process.

Co-Existence Mediator

Blockchain technology has introduced a new mechanism for the recordation and verification of transactions that provides many benefits over traditional bookkeeping methodologies. Therefore, it may be advantageous to adopt blockchain technology in such areas. However, many blockchain network (BN) projects (e.g., those attempting to transition traditional record-keeping ledgers to utilize blockchain) have a usage adoption issue. This adoption issue is primarily due to various details of how a blockchain network may coexist with existing enterprise-based transaction systems. Most issues of asset transfer are governed by a fragmented system that has to coordinate with other entities in a network. This coordination is necessary between various enterprise processes across entities of system players that collectively participate in the movement of assets. However, this collective processing may be inefficient and expensive.

The use of blockchain may help to address this issue by flattening the process-enabling participation of various entities on a flattened process with the use of contracts, such as smart contracts, multi-sig, wallets, endorsements, and agreements. While the use of blockchain may flatten the process with processing transparency, in many cases, an existing enterprise system (enterprise transaction system (ETS)) still exists in an enterprise that continues in serving its customers. In order to transition or migrate from an ETS for handling transactions to a BN, it is desirable to ensure that a BN implementation is least disruptive and facilitates a seamless interaction between existing transaction systems powered by middleware servers, decision servers, and new models of processing transactions. To achieve this, it is further desirable that a BN be able to coexist with the rest of the enterprise and the participants of the business network working adjacent to the existing systems, which may have overlapping and complementary functions.

Disclosed herein is a coexistence mediator in the form of a method and apparatus (and related computer media) to facilitate a BN that co-exists with an ETS that eases the migration of transactions from the existing ETS to a BN. The BN, as defined herein, may include one or more blockchain systems with a respective processor(s) capable of handling blockchain transactions, along with the interconnecting network used to share information between blockchain nodes. The coexistence mediator may act as a client to the BN that intercepts the transaction to determine new transactions or ones with existing transaction contexts (i.e., those that are "in-flight"). For transactions associated with an existing ETS context, the coexistence mediator may act as a "glue code" to broker the transaction for the BN and the blockchain way of processing the transaction.

Figure 9A:
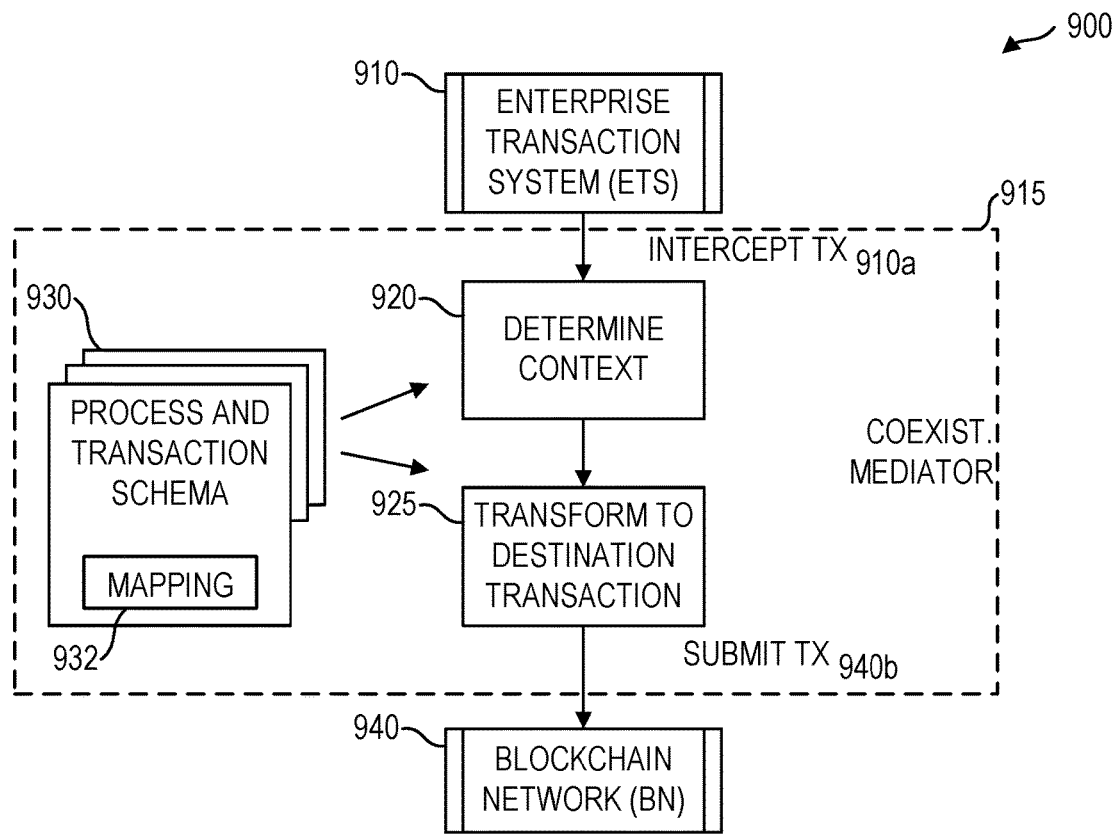
FIG. 9A is a block-flow diagram illustrating basic components for transforming enterprise transaction system transactions to blockchain transactions, according to some implementations.

FIG. 9A is a block-flow diagram illustrating a process 900 and relevant basic entities for transaction processing, according to some implementations. An enterprise may have a legacy ETS 910 that has historically been used for transaction processing, including recording of the transaction. A trusted mechanism (comprising the coexistence mediator 915) may be provided as part of an enterprise integration apparatus of the ETS 910 that utilizes the following principles. First, the trusted mechanism may act as a client to the ETS 910 and to the BN 940 that intercepts a transaction request 910a (an ETS transaction comprising ETS transaction information (ETS-TI). The intercepted transaction may be a new transaction that does not yet have a context, or it may be an "in-flight" transaction that has an existing context. The ETS-TI may comprise transaction context information (TCI—for the ETS-TI, this is ETS-TCI). The TCI may be a part of the transaction, stored on a respective transaction processing system (ETS, BN), or split. The intercepted transaction is associated with the enterprise or ETS, and the transaction request 910a is intercepted in order to form a new transaction or handle the transaction having existing transaction context.

Second, the trusted mechanism may intercept the transaction request 910a with a new context and act as a pass-through service to submit the transaction having existing enterprise context. The trusted mechanism may act as a "glue code" to broker the transition for migration of the intercepted transaction 910a from the ETS 910 to the BN 940 (and thus, to the blockchain way of processing the transaction). The "glue code" may make use of the process and transaction schema 930 and any related mapping 932 information or procedures.

Third, the trusted mechanism may utilize the coexistence mediator 915, which acts as a broker that: a) ensures the schema of the current ETS 910 is preserved for the transaction, while adhering to the design of the ETS 910. The coexistence mediator 915 may also transform 925 the transaction 910a to the blockchain-based model for the BN 940 utilizing the process and transaction schema 930. The schema 930 contains information about the processes on both sides and a mapping 932 between them (e.g., the mapping of transactions). The mapping 932 may be more complex than just a one-to-one mapping of the transactions. The mapping 932 may be of any degree of cardinality, and may contain a definition of specific transaction invocation sequences. The transaction mapping 932 may also describe attribute mapping/transformations. The schema 930 and mapping 932 may make use of the transaction table 1310 and state context 1350 described in more detail below (see FIG. 13), and may include data mappings and related processes to ensure a proper conversion of the transaction information. The processes of either side (the ETS 910 and the BN 940) may only partially overlap, and there may be multiple blockchains in the BN 940 as well as multiple ETSs 910 interacting at the same time. Depending on some form of indication, transactions may be rerouted into and out of the ETS 910, and the processing and transaction schema 930 may contain the mapping 932 for going in either direction.

In this way, the coexistence mediator 915 may, utilizing the schema 930 and mapping 932, in conjunction with the transaction table 1310 and state context 1350, convert the ETS-TI into BN transaction information (BN-TI) and vice versa (i.e., convert the BN-TI into the ETS-TI, when needed, such as in the event of a BN recording failure).

The coexistence mediator 915 may further: b) generate an awareness object that maps the translated transaction to a block object and uses the block object as mechanism to query between the ETS 910 and the BN 940. The block object may be, e.g., an object that contains the relevant information of a transaction that is required to convert the object into one of several different transaction system formats. It may further support other adjacent systems, such as reporting and adjacent transaction systems.

The coexistence mediator 915 may further: c) participate in a transaction locking mechanism while the transaction is transient to the BN 940. It may further: d) upon transaction failure, also aid in redirecting transactions to be processed through the traditional/legacy ETS 910. The failure may be detected, e.g., when any of the entities processing the transaction returns a failure. Such a failure may be, e.g., a database commit failure or a business logic failure.

Figure 9B:
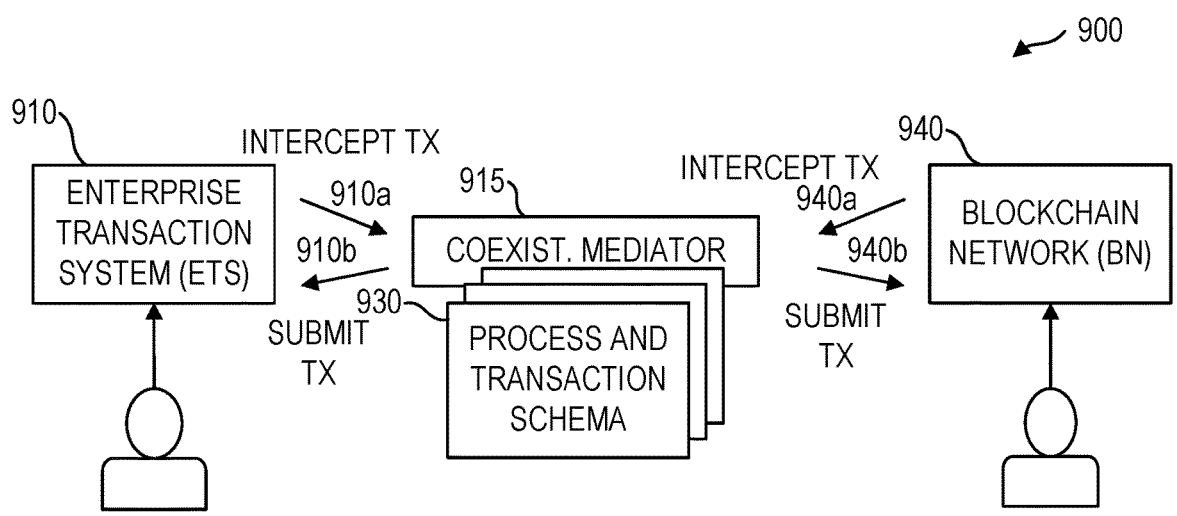
FIG. 9B is a block diagram illustrating the bi-directionality of translations between the enterprise transaction system transactions and the blockchain transactions, according to some implementations.

The coexistence mediator 915 may also: e) assist in a bi-directional flow of transactions that go in either or both directions (to the ETS 910 or the BN 940). FIG. 9B is a block diagram illustrating the bi-directionality of translations between the ETS transactions and the blockchain transactions, according to some implementations. The coexistence mediator 915 may intercept a transaction 910a from the ETS 910 and process it into a submission transaction 940b for the BN 940, but it may also intercept a transaction 940a from the BN 940 and process it into a submission transaction 910b for the ETS 910. This may be a subject of a particular configuration and may change over time. In general, the progressive path is to transition the flow of transactions to use the BN 940, while a flow of transactions to the ETS may provide for, e.g., backwards compatibility. However, this bi-directional flow may also be a permanent solution. A failure in the BN of an in-flight transaction may cause the processing to revert to the ETS 910 to be processed depending on the situation. For new transactions (those that do not already have a context), such a failure is handled by the blockchain error handling. However, for in-flight transactions (those that have a context), such a failure reverts to the ETS 910.

Use of the coexistence mediator 915 thus allows the BN 940 to coexist with the rest of the enterprise and the participants of the business network working adjacent to the existing ETS 910, which may have overlapping and complementary functions. The coexistence mediator 915 may thus serve to drain in-flight or long running transaction systems (e.g., move transactions from the legacy ETS 910 to the BN 940) and provide an avenue to cutover transaction handling to new blockchain models. This may thus facilitate longevity and ongoing business process with two concurrent transaction systems.

Figure 10:
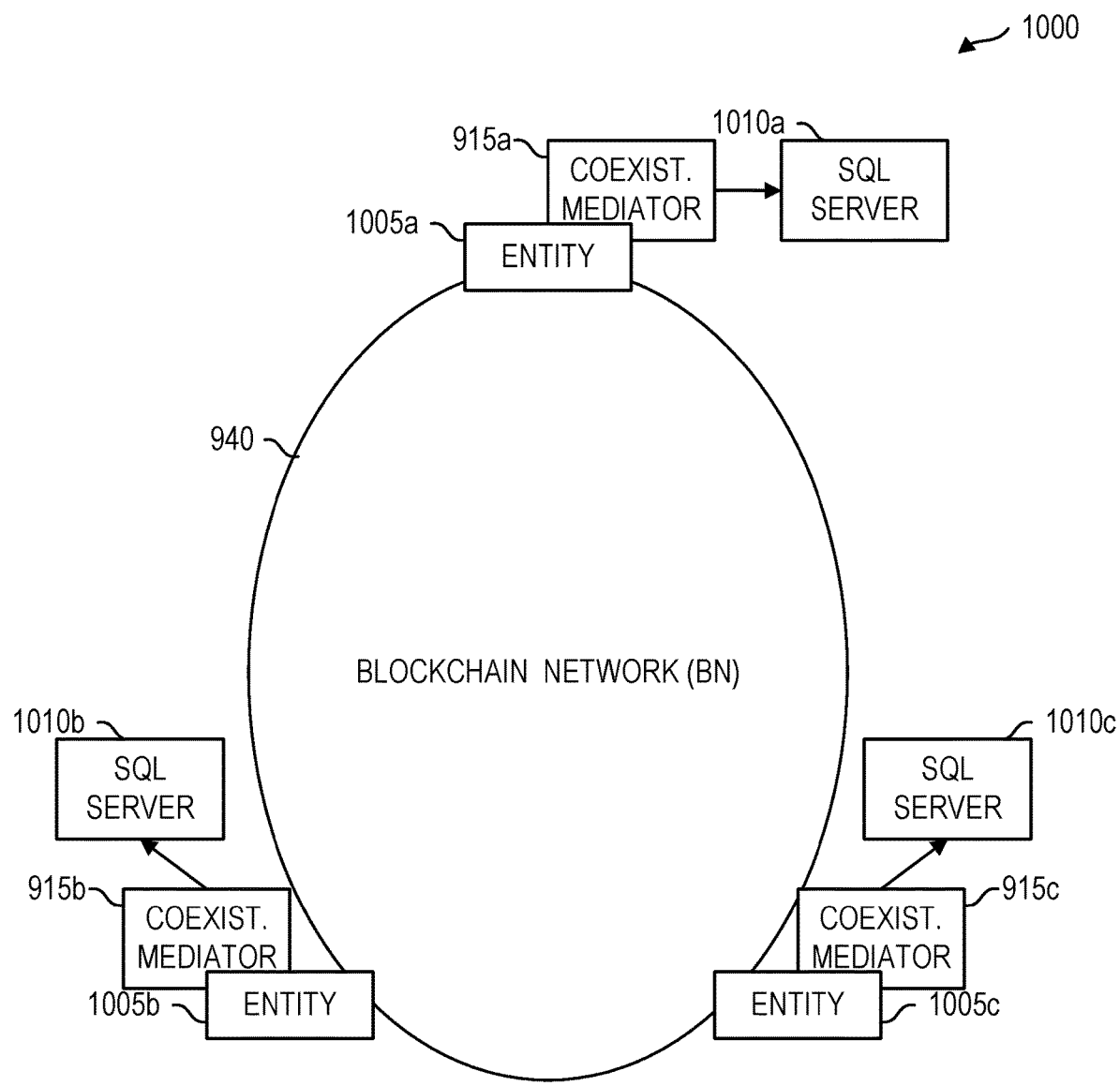
FIG. 10 is a block diagram of a network illustrating coordination with other enterprise coexistence mediators to ensure that multi-party transactions are coordinated in the network prior to being recorded on the network, according to some implementations.

FIG. 10 is a block diagram of a network illustrating coordination with other enterprise coexistence mediators to ensure that multi-party transactions are coordinated in the network prior to being recorded on the network, according to some implementations. FIG. 10 illustrates a plurality of entities 1005a, 1005b, 1005c (reference numbers with letter extensions may herein be referred to collectively or by way of example by the reference number alone) that may utilize the BN 940. Each entity 1005a, 1005b, 1005c may utilize a respective coexistence mediator 915a, 915b, 915c, that operates as described herein and interface to their respective ETS 910, which is illustrated by way of example in FIG. 10 as a database in the form of a structured query language (SQL) database 1010a, 1010b, 1010c. Although an implementation of the ETS 910 is shown implemented by the SQL database 1010, many variants of such transaction systems may be utilized. Different ETSs 910 may be utilized by each of the entities 1005 that are involved in utilizing the BN 940. In a multi-party (or multi-entity) network, as shown in FIG. 10, each entity may have an option of using a coexistence mediator node as a representative, or, the enterprise/entity coexistence mediator may also be a centralized function by a consortium (e.g., a network operator, based on who manages it and where it is housed).

Figure 11A:
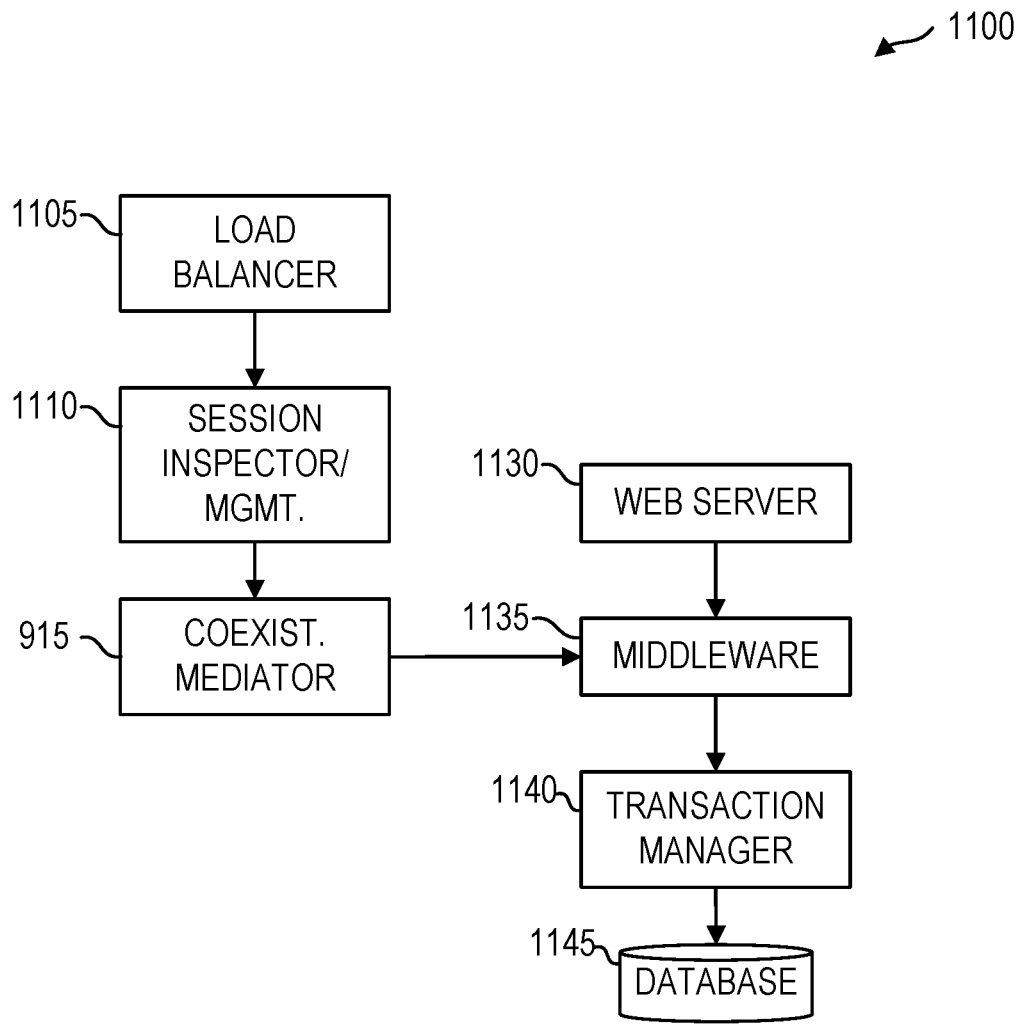
FIG. 11A is a block diagram illustrating utilization of the coexistence mediator within other components of a transaction processing system, according to some implementations.

FIG. 11A is a block diagram illustrating utilization of the coexistence mediator within other components of a transaction processing system, according to some implementations. FIG. 11A illustrates various components of a system 1100 (which may be a part of the entity 1005) within which the coexistence mediator 915 may operate. Since the system 1100 may utilize multiple processors for transaction processing, a load balancer 1105 may be utilized to distribute transaction processing across the processors for maximum efficiency, responsiveness, or to meet some other metric of importance. A session inspector/manager 1110 may be provided to perform preliminary operations on a received transaction before the transaction is intercepted by the coexistence mediator 915. The coexistence mediator 915 may interface with middleware 1135 of the system, the middleware 1135 acting as the glue for the server component, shown in FIG. 11 as, for example, a web server 1130, and the transaction manager 1140 of the ETS 910. The database 1145 that holds the transaction records may be implemented using, e.g., the SQL server 1010.

Figure 11B:
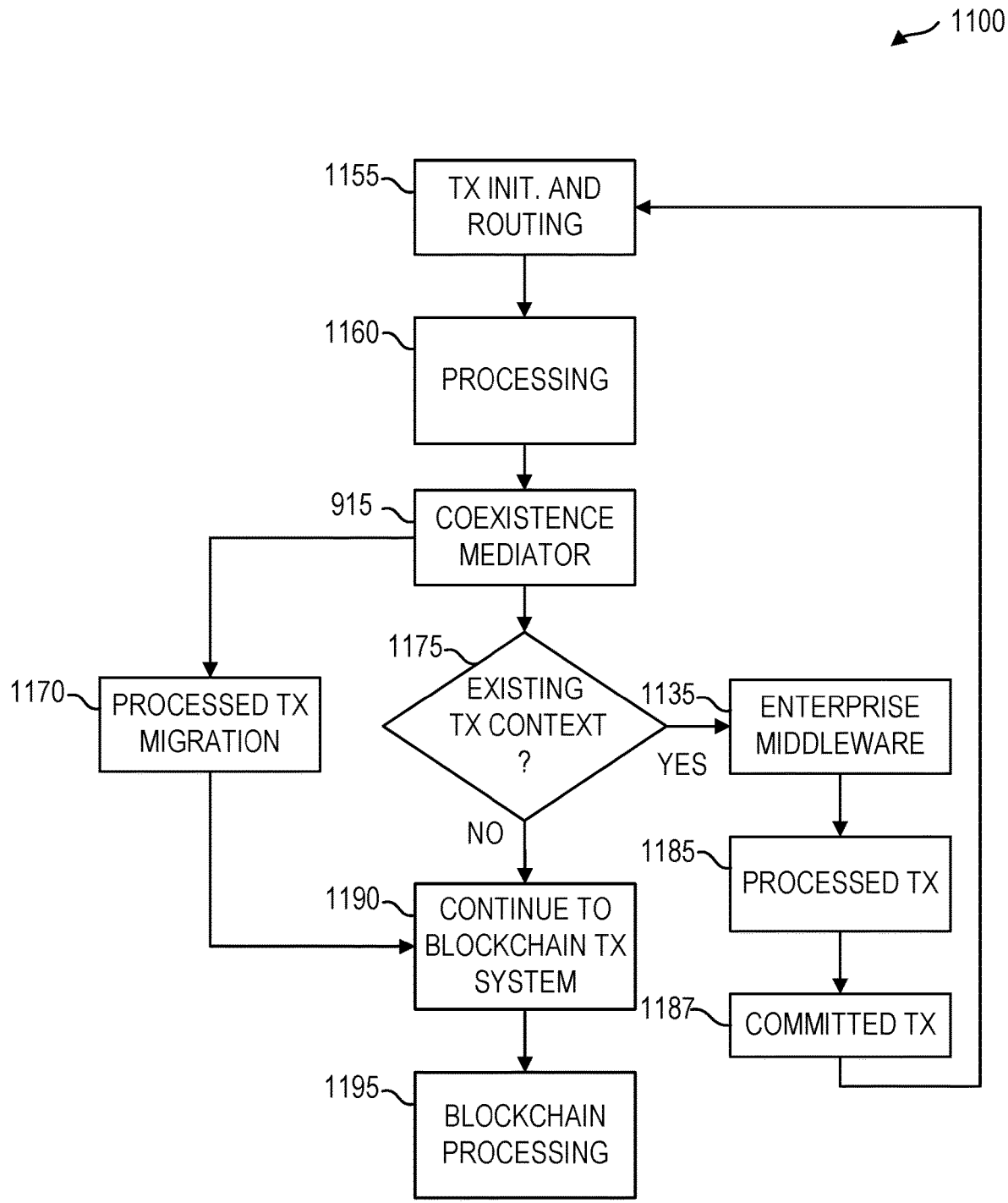
FIG. 11B is a block diagram illustrating transaction handling by the coexistence mediator, according to some implementations.

FIG. 11B is a block-flow diagram that illustrates transaction handling by the coexistence mediator, according to some implementations, and provides a more detailed view of the system 1100. A transaction initialization and routing component 1155 intercepts a transaction and provides a received transaction with preliminary processing 1160 (which may include inspecting a session identifier to determine if it is an existing (in-flight) transaction or a new transaction) before the coexistence mediator 915 handles the processing of the transaction. The coexistence mediator 915 implements a transaction context awareness by taking any transaction context available for the transaction and passes its processed transaction context into the processed transaction migration entity 1170. Conditioned upon there already being existing transaction context 1175: Y (from the existing/in-flight transaction), then the enterprise middleware 1135 is used to process the transaction 1185 according to the legacy ETS 910. After the transaction has been processed, it is then a committed transaction 1187 under the legacy system. When the transaction is to be processed under the BN 940, the processed ETS-TI may be migrated 1170 from the ETS 910 format into BN-TI for the BN 940 format, and related TCI may be converted as well.

After the migration, the transaction may continue on to the BN 1190 wherein normal blockchain processing of the transaction takes place. A blockchain processing 1195 may then update the transaction record in the enterprise with the new blockchain transaction identifier and switch the ETS transaction context to a BN transaction context to indicate blockchain processing. In this way, the coexistence mediator 915 intercepts the transaction request. In sum, a transaction request with a new context (i.e., one without an existing transaction context), the coexistence mediator 915 acts as a pass-through service to submit the transaction for BN processing. For a transaction request with existing enterprise context, the coexistence mediator 915 acts as a glue code to broker the transition for migration of transaction to the BN and blockchain way of processing transaction. The transaction requests are either new or in-flight transactions (which have a context). If the transaction is moved over to the BN, after successfully completing processing of the ETS of in-flight transactions, then the transaction is committed to the BN 940 as a new transaction with mapping, as described above (and with a session ID). If the external blockchain processing of the transaction fails, then the processing of the transaction goes through the ETS 910 to be processed as an ETS transaction. If the transaction request 910*a* is a new transaction, then is handled in a normal blockchain processing manner.

Figure 12A:
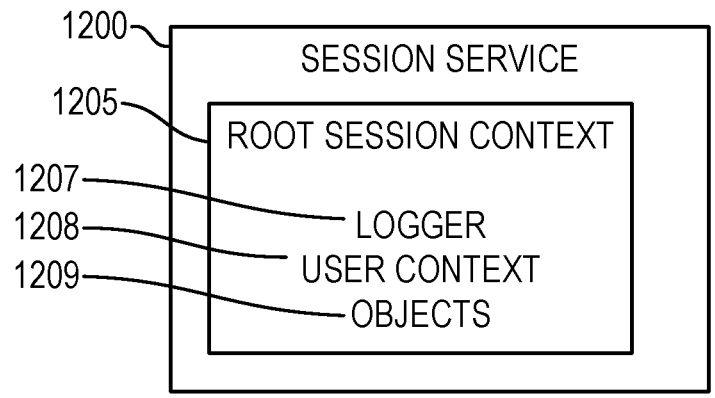
FIGS. 12A and 12B are block diagrams illustrating a session service with a root session context and an additional session context, according to some implementations.
Figure 12B:
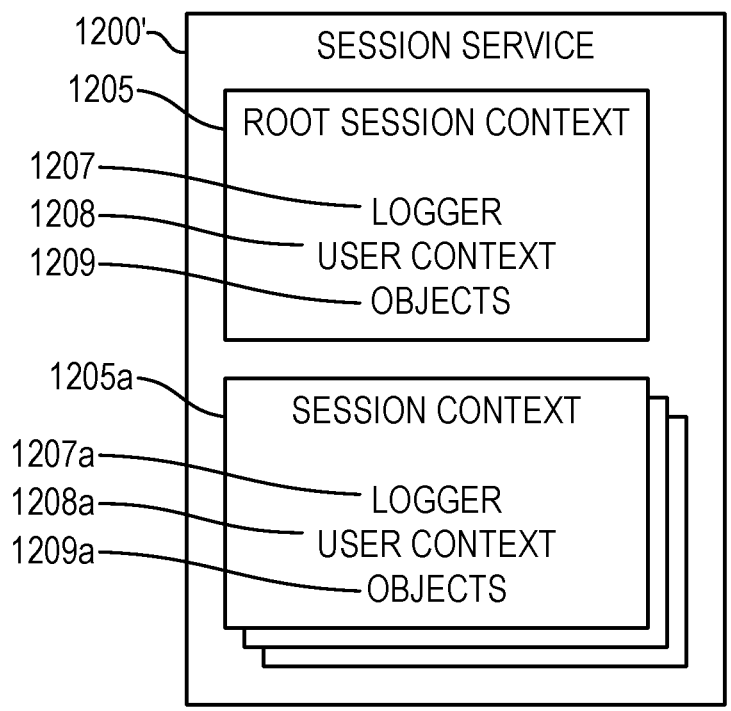

FIGS. 12A and 12B are block diagrams that illustrate a session service model for in an SaS session context example for operation of the coexistence mediator. In FIG. 12A, when the session service 1200 is initialized, it automatically creates a root session context 1205. The root session context 1205 is distinct per virtual machine (VM) (such as a Java virtual machine (JVM)), and may be used to track shared resources that are global to the application. These shared resources may include, for example, a logger 1207 for logging activities, states, errors, and other information related to the transaction handling, the user context 1208, and various objects 1209 that may be used by the coexistence mediator to track information within the session service. This may be analogized to an on-line (e.g., a web-based) shopping experience in which a user places items intended to be purchased in a cart. Even if the session is interrupted, the user may still return to the transaction and find the items that were placed in the cart in order to complete the transaction. FIG. 12B is similar to FIG. 12A, but it shows that an additional session context 1205*a* may be created to track client-based contexts (in a client-server-based architecture, or, this may be related to an SDK or a component, such as a web browser, making a request). The additional session context 1205*a* may also have the shared resources of the logger 1207*a*, a user context 1208*a*, and objects 1209*a*, as described above.

Figure 13:
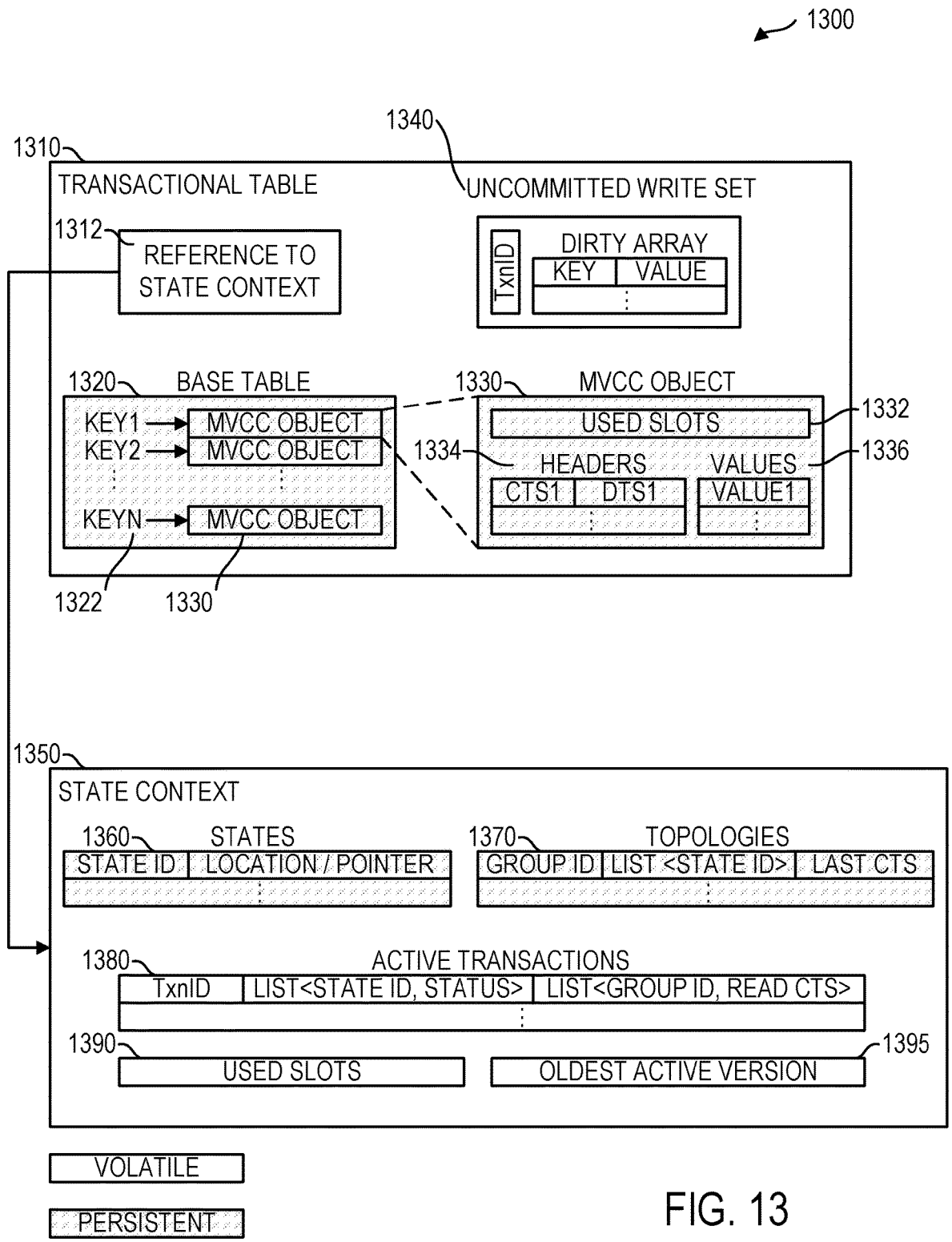
FIG. 13 is a block diagram illustrating a transaction table and state context, according to some implementations.

FIG. 13 is a block diagram that illustrates a transaction table and state context as they relate to one another 1300, according to some implementations. A transaction table 1310 comprises various elements that may be utilized in the system. A reference to the state context 1312 provides a pointer to the state context 1350 (discussed in more detail below) in the event that a state context exists for an in-flight transaction. A base table 1320 comprises a plurality of records, each comprising a key identifier 1322 associated with a multiversion concurrency control (MVCC) object 1330, which provides concurrent access to a database to implement transactional memory. The MVCC object 1330 comprises used slots 1332 and a plurality of headers 1334 that comprise a create time stamp (CTS) as well as a delete timestamp (DTS) associated with particular values 1336.

With regard to the state context 1350, a states table 1360 comprises a plurality of records, each comprising a state identifier as well as a location pointer. A topologies table 1370 comprises a plurality of records, each comprising a group identifier, a list associated with the state identifier, and a last CTS. An active transactions table 1380 comprises a plurality of transaction records, each comprising a transaction identifier, a list associated with the state identifier and a status, and a list associated with the group identifier and a read CTS. The state context 1350 may also comprise used slots 1390 and an oldest active version 1395.

Technical Application

The one or more embodiments disclosed herein accordingly provide an improvement to computer technology. For example, an improvement to use of a digital transaction ledger allows for more efficient and effective transition to a blockchain transaction ledger and away from a legacy enterprise ledger system.

Computer Readable Media

The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for coordinating data and transactions between an enterprise transaction system (ETS) of an enterprise and a blockchain network (BN) comprising:
   intercepting, by a coexistence mediator, a specific ETS transaction comprising ETS transaction information (ETS-TI) associated with an enterprise, wherein the ETS-TI includes transaction context information (ETS-TCI) regarding the ETS transaction;
   determining an ETS transaction context of the specific ETS transaction from the ETS-TCI;
   responsive to determining the ETS transaction context represents an in-flight ETS transaction having an existing transaction content upon its interception, rerouting, by the coexistence mediator, the transaction from the ETS to the BN, wherein the rerouting comprises:
      converting the ETS-TI to BN transaction information (BN-TI);
      interfacing with the BN to create and record a processed BN transaction as a transaction record;
      providing, by the coexistence mediator upon recording the BN transaction, new BN-TI associated with the BN transaction, wherein the new BN-TI comprises a BN transaction id; and
      switching the ETS transaction context to a BN transaction context.

2. The method of claim 1, further comprising communicating, by the coexistence mediator, with other coexistence mediators to ensure that multiparty-based transactions are coordinated in a network comprising the coexistence mediator and the other coexistence mediators prior to being recorded on the BN.

3. The method of claim 1, further comprising, processing, by the coexistence mediator, a query of a queried transaction between the BN and the ETS.

4. The method of claim 3, wherein the processing of the query further comprises:
   generating an awareness object that maps the queried transaction to a block object; and
   using the block object as mechanism to query between the BN and the ETS.

5. The method of claim 1, further comprising:
   detecting a failure in the recording of the blockchain transaction, and responsive to detecting the failure:
      converting or reverting from the BN transaction to the ETS transaction; and
      interfacing with the ETS to record the ETS transaction as a transaction record that is not processed again.

6. The method of claim 1, wherein the BN transaction is not processed again by the ETS.

7. The method of claim 1, wherein the converting of the ETS-TI to the BN-TI comprises:
   accessing a processing and transaction schema comprising a mapping; and
   utilizing the processing and transaction schema to translate the ETS-TI to the BN-TI.

8. The method of claim 7, wherein the processing and transaction schema comprises a transaction table and a state context that is used to translate the ETS-TI to the BN-TI.

9. The method of claim 8, wherein the transaction table and the state context comprise information for mapping the BN-TI to the ETS-TI.

10. The method of claim 1, further comprising participating in a transaction locking mechanism while the BN transaction is transient to the BN.

11. The method of claim 1, further comprising conditioned upon a BN network transaction failure, redirecting the transaction to be processed through the ETS.

12. A system for coordinating data and transactions between an enterprise transaction system (ETS) of an enterprise and a blockchain network (BN), the system comprising:
a co-existence mediator comprising a processor and a memory, the processor configured to:
intercept an ETS transaction comprising ETS transaction information (ETS-TI) associated with an enterprise, wherein the ETS-TI includes transaction context information (ETS-TCI) regarding the ETS transaction;
determine an ETS transaction context from the ETS-TCI;
responsive to the determination the ETS transaction context represents an in-flight ETS transaction having an existing transaction content upon its interception, reroute the transaction from the ETS to the BN, wherein the rerouting causes the processor to:
convert the ETS-TI to BN transaction information (BN-TI);
interface with the BN to create and record a processed BN transaction as a transaction record;
provide, by the coexistence mediator upon recording the BN transaction, new BN-TI associated with the BN transaction, wherein the new BN-TI comprises a BN transaction id; and
switch the ETS transaction context to a BN transaction context.

13. The system of claim 12, wherein the processor is further configured to communicate with other coexistence mediators to ensure that multiparty-based transactions are coordinated in a network comprising the coexistence mediator and the other coexistence mediators prior to being recorded on the BN.

14. The system of claim 12, wherein the processor is further configured to process a query of a queried transaction between the BN and the ETS.

15. The system of claim 14, wherein the processing of the query further causes the processor to:
generate an awareness object that maps the queried transaction to a block object; and
use the block object as mechanism to query between the BN and the ETS.

16. The system of claim 12, wherein the processor is further configured to:
detect a failure in the recording of the blockchain transaction, and responsive to the detection of the failure:
convert or rever from the BN transaction to the ETS transaction; and
interface with the ETS to record the ETS transaction as a transaction record that is not processed again.

17. The system of claim 12, wherein the BN transaction is not processed again by the ETS.

18. The system of claim 12, wherein the conversion of the ETS-TI to the BN-TI causes the processor to:
access a processing and transaction schema comprising a mapping; and
utilize the processing and transaction schema to translate the ETS-TI to the BN-TI.

19. The system of claim 18, wherein:
the processing and transaction schema comprises a transaction table and a state context that is used to translate the ETS-TI to the BN-TI;
the transaction table and the state context comprise information for mapping the BN-TI to the ETS-TI; and
the processor is further configured to:
participate in a transaction locking mechanism while the BN transaction is transient to the BN; and
conditioned upon a BN network transaction failure, redirect the transaction to be processed through the ETS.

20. A method for coordinating data and transactions between an enterprise transaction system (ETS) of an enterprise and a blockchain network (BN) comprising:
intercepting, by a coexistence mediator, an ETS transaction comprising ETS transaction information (ETS-TI) associated with an enterprise, wherein the ETS-TI includes transaction context information (ETS-TCI) regarding the ETS transaction;
determining an ETS transaction context from the ETS-TCI;
responsive to determining the ETS transaction context represents an in-flight ETS transaction, rerouting, by the coexistence mediator, the transaction from the ETS to the BN, wherein the rerouting comprises:
converting the ETS-TI to BN transaction information (BN-TI);
interfacing with the BN to create and record a processed BN transaction as a transaction record;
providing, by the coexistence mediator upon recording the BN transaction, new BN-TI associated with the BN transaction, wherein the new BN-TI comprises a BN transaction id; and
switching the ETS transaction context to a BN transaction context; and
participating in a transaction locking mechanism while the BN transaction is transient to the BN.

* * * * *